(12) United States Patent
Osoniwa et al.

(10) Patent No.: US 7,699,546 B2
(45) Date of Patent: Apr. 20, 2010

(54) LIGHT AMOUNT ADJUSTING DEVICE AND IMAGE CAPTURE APPARATUS

(75) Inventors: Kazumasa Osoniwa, Chiba (JP); Yutaka Maeda, Tokyo (JP); Hideo Ohkuma, Tokyo (JP)

(73) Assignee: Sony Corporation, Tokyo (JP)

( * ) Notice: Subject to any disclaimer, the term of this patent is extended or adjusted under 35 U.S.C. 154(b) by 285 days.

(21) Appl. No.: 11/965,259

(22) Filed: Dec. 27, 2007

(65) Prior Publication Data

US 2008/0170851 A1    Jul. 17, 2008

(30) Foreign Application Priority Data

Jan. 12, 2007    (JP) .............................. 2007-004737

(51) Int. Cl.
*G03B 9/02*    (2006.01)
*G02B 26/02*    (2006.01)

(52) U.S. Cl. ...................................... 396/510; 359/227

(58) Field of Classification Search ................. 396/510, 396/452, 458, 471, 505, 449–451; 359/227, 359/234; 348/363
See application file for complete search history.

(56) References Cited

U.S. PATENT DOCUMENTS 5,729,783 A * 3/1998 Depatie et al. .............. 396/508
6,269,226 B1 * 7/2001 Aoshima ..................... 396/458
2002/0031353 A1 * 3/2002 Naganuma .................. 396/452
2002/0136547 A1 * 9/2002 Nomura et al. ............... 396/72
2004/0258405 A1 * 12/2004 Shiratori et al. ............. 396/458

FOREIGN PATENT DOCUMENTS

JP    2005-173133    6/2005

* cited by examiner

*Primary Examiner*—W. B. Perkey
*Assistant Examiner*—Noam Reisner
(74) *Attorney, Agent, or Firm*—Oblon, Spivak, McClelland, Maier & Neustadt, L.L.P.

(57) ABSTRACT

A light amount adjusting device includes: a cover plate having a light-passing hole; a first separator being sheet-shaped and having a hole; a second separator being elastically deformable and sheet-shaped, positioned on a side opposite to the cover plate with the first separator therebetween, and having a hole; a first light amount adjusting blade movable between the cover plate and the first separator; a second light amount adjusting blade being movable between the first separator and the second separator; a base body to which the cover plate, the first separator, and the second separator are mounted, having a throughhole and mounting grooves, the throughhole being formed to have a diameter larger than a diameter of the hole of the second separator, the mounting grooves allowing the second separator to be mounted therein and being opened toward the throughhole.

6 Claims, 37 Drawing Sheets

FIG.16
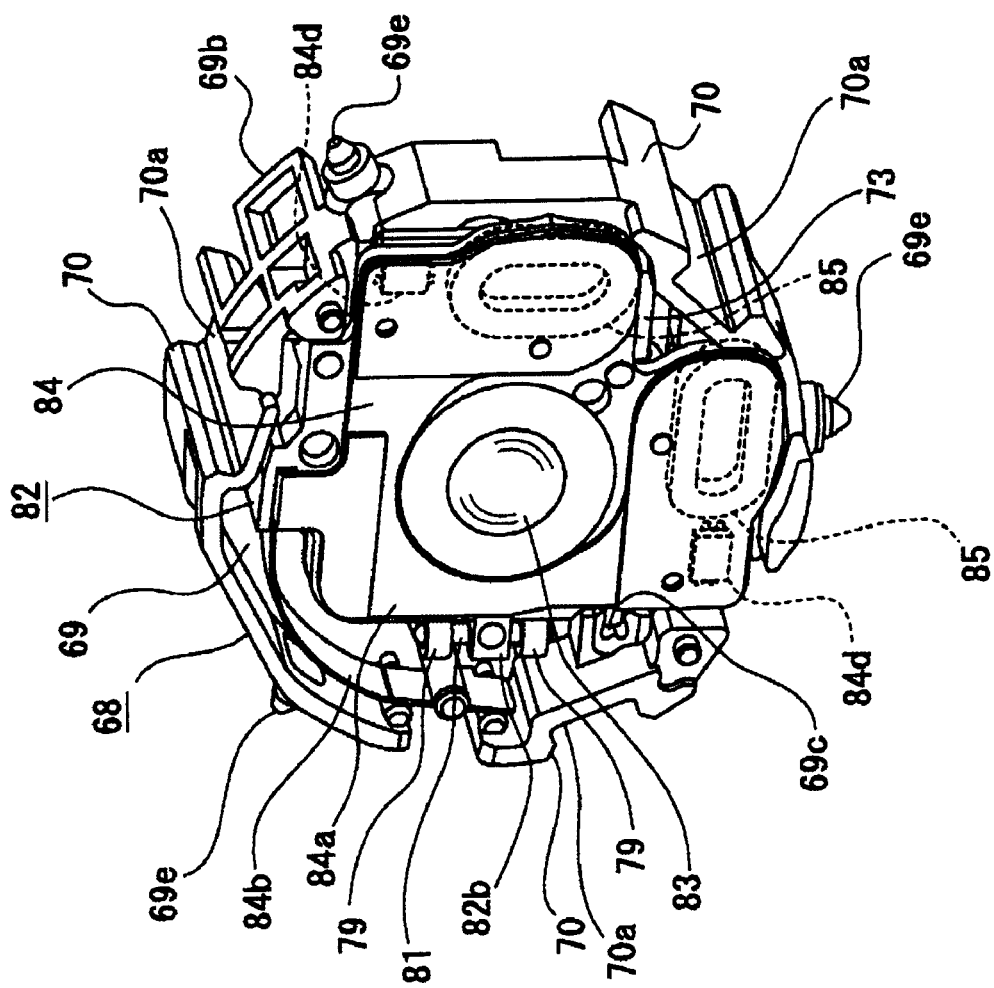
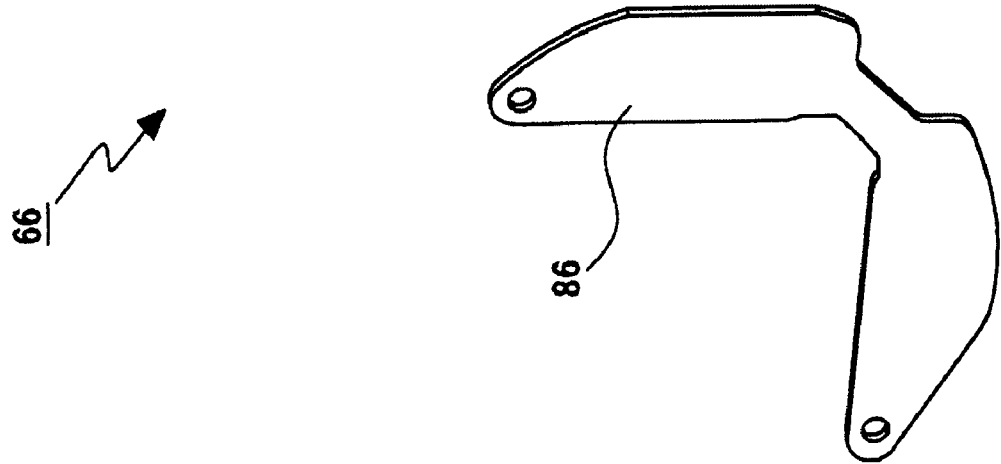

LIGHT AMOUNT ADJUSTING DEVICE AND IMAGE CAPTURE APPARATUS

BACKGROUND OF THE INVENTION

1. Field of the Invention

The present invention relates to technical fields of light amount adjusting device and image capture apparatus.

2. Description of Related Art

Image capture apparatuses are provided with a light amount adjusting device for adjusting an amount of light captured via lens groups.

In one such light amount adjusting device, two light amount adjusting blades, i.e., a shutter blade and a filter blade, are incorporated, such that the shutter blade is arranged between a base body formed from a resin material and one of separators, whereas the filter blade is arranged between the one separator and the other separator (see, e.g., Japanese Patent Application Publication No. JP 2005-173133, Patent Reference 1).

SUMMARY OF THE INVENTION

However, in the light amount adjusting device disclosed in Patent Reference 1, one light adjusting blade (shutter blade) is arranged between the base body formed from the resin material and the separator, and is thick due to the fact that the base body is made from a resin material. If there is a member arranged on a side opposite to the separator with having the base body therebetween, the member needs be arranged at a position not interfering with the base body, which requires a large arrangement space in the optical-axis direction, and hence prevents realization of a thickness reduction.

Accordingly, it is desirable to provide technology for realizing a thickness reduction in the optical-axis direction. The present invention is made in view of the above circumstances.

In embodiments of the present invention, there are provided a light amount adjusting device and an image capture apparatus both of which include a cover plate having a light-passing hole, a first separator being sheet-shaped and having a hole, a second separator being elastically deformable and sheet-shaped, positioned on a side opposite to the cover plate with the first separator therebetween, and having a hole, a first light amount adjusting blade being movable between the cover plate and the first separator, for adjusting an amount of light, a second light amount adjusting blade being movable between the first separator and the second separator, for adjusting the amount of light, a base body to which the cover plate, the first separator, and the second separator are mounted, having a throughhole and mounting grooves, the throughhole being formed to have a diameter larger than a diameter of the hole of the second separator, the mounting grooves allowing the second separator to be mounted therein and being opened toward the throughhole, a first actuator for operating the first light amount adjusting blade, and a second actuator for operating the second light amount adjusting blade. In the light amount adjusting device and the image capture apparatus, the base body is formed by injection molding using a first mold and a second mold which are separated in a direction in which the throughhole passes through. Furthermore, the mounting groove is formed by forming the mounting groove forming projections in the first mold and the second mold, respectively, the mounting groove forming projections projecting in such directions as to come closer to each other, and coming into contact with each other during abutment of the first and second molds for charging resin melt into cavities. Furthermore, the second separator is mounted onto the base body by allowing the elastically deformed second separator to be elastically returned so as to insert at least a part of an outer circumferential portion thereof into the mounting grooves, by positioning the second separator further toward the second light amount adjusting blade than the throughhole, and by positioning the hole on an inner side of the throughhole.

Accordingly, in the above-mentioned light amount adjusting device and image capture apparatus, it is possible to arrange the member to be arranged on the side opposite to the second separator with having the base body therebetween, inside the throughhole of the base body.

Furthermore, in the above-mentioned light amount adjusting device and image capture apparatus, it is possible to move the member arranged on the side opposite to the second separator with having the base body therebetween, to a position at which the member is inserted into the throughhole, thereby realizing a thickness reduction of the light amount adjusting device in the optical-axis direction.

In another embodiment of the present invention, a plurality of mounting projections may be provided on the outer circumferential portion of the second separator so as to be spaced apart in a circumferential direction, the mounting projections being mounted while inserted into the mounting grooves of the base body. Accordingly, it is possible to stabilize the mounting of the second separator on the base body.

In still another embodiment of the present invention, a pair of shutter blades may be used as the first light amount adjusting blade, a light reducing filter may be used as the second light amount adjusting blade, the cover plate may be formed from a metallic material, and a sliding projection along which the first light amount adjusting blade is slid may be provided on the cover plate. Accordingly, frictional forces occurring during operations of the shutter blades are small, thereby improving the reliability of operations and reducing power consumption.

In still another embodiment of the present invention, first sliding projections and second sliding projections may be provided as the sliding projection of the cover plate. The first and second projections may have different amounts of projection and be slid by the pair of shutter blades, respectively. Accordingly, the pair of shutter blades is held in different positions in a thickness direction, which prevent the pair of shutter blades from interfering with each other during rotations, thereby realizing smooth operations of the pair of shutter blades.

In still another embodiment of the present invention, the shutter blades may be rotatably supported by the base body, and the sliding projections of the cover plate may be formed into approximate arcs on circles having rotating centers of the shutter blades as centers. Accordingly, frictional resistances of the shutter blades to the sliding projections occurring during rotations are hard to change, thereby realizing the smooth operations of the shutter blades.

In the above-mentioned image capture apparatus, it is possible to move the member arranged on the side opposite to the second separator with having the base body therebetween, to a position at which the member is inserted into the throughhole, thereby realizing a thickness reduction of the light amount adjusting device in the optical-axis direction and the size-reduction of the image capture apparatus.

BRIEF DESCRIPTION OF THE DRAWINGS

FIG. 16 is an enlarged perspective view showing an outer yoke and other members in an exploded form;

DETAILED DESCRIPTION OF EMBODIMENTS

An embodiment of the present invention will now be described with reference to the accompanying drawings.

The following describes an embodiment in which the present invention is applied to a still camera. It should be noted that the scope to which the present invention is applicable is not limited to still cameras, but includes, e.g., video cameras and various types of image capture apparatuses incorporated into other equipment.

In the following description, front/rear/up/down/left/right directions denote such directions as viewed from a photographer during image taking with a still camera. Accordingly, an object side is referred to as being the front, whereas a photographer side is referred to as being the rear.

It is also noted that the front/rear/up/down/left/right directions are indicated merely for purposes of illustration, and thus the carrying out of the present invention is not restricted by these directions.

Figure 1:
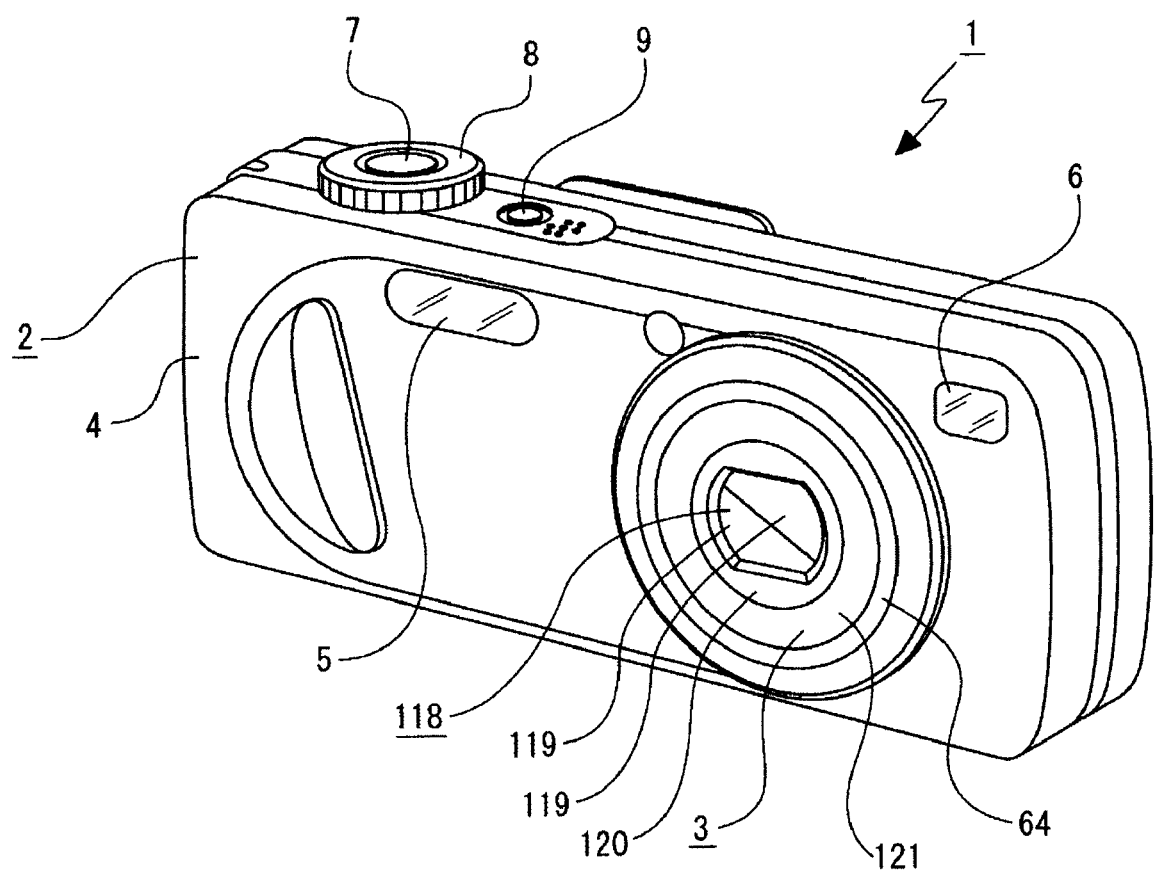
FIG. 1 is a diagram showing, along with FIGS. 2 through 37, an image capture apparatus according to an embodiment of the present invention, FIG. 1 being a perspective view of the image capture apparatus with a lens barrel accommodated in an apparatus body.
Figure 2:
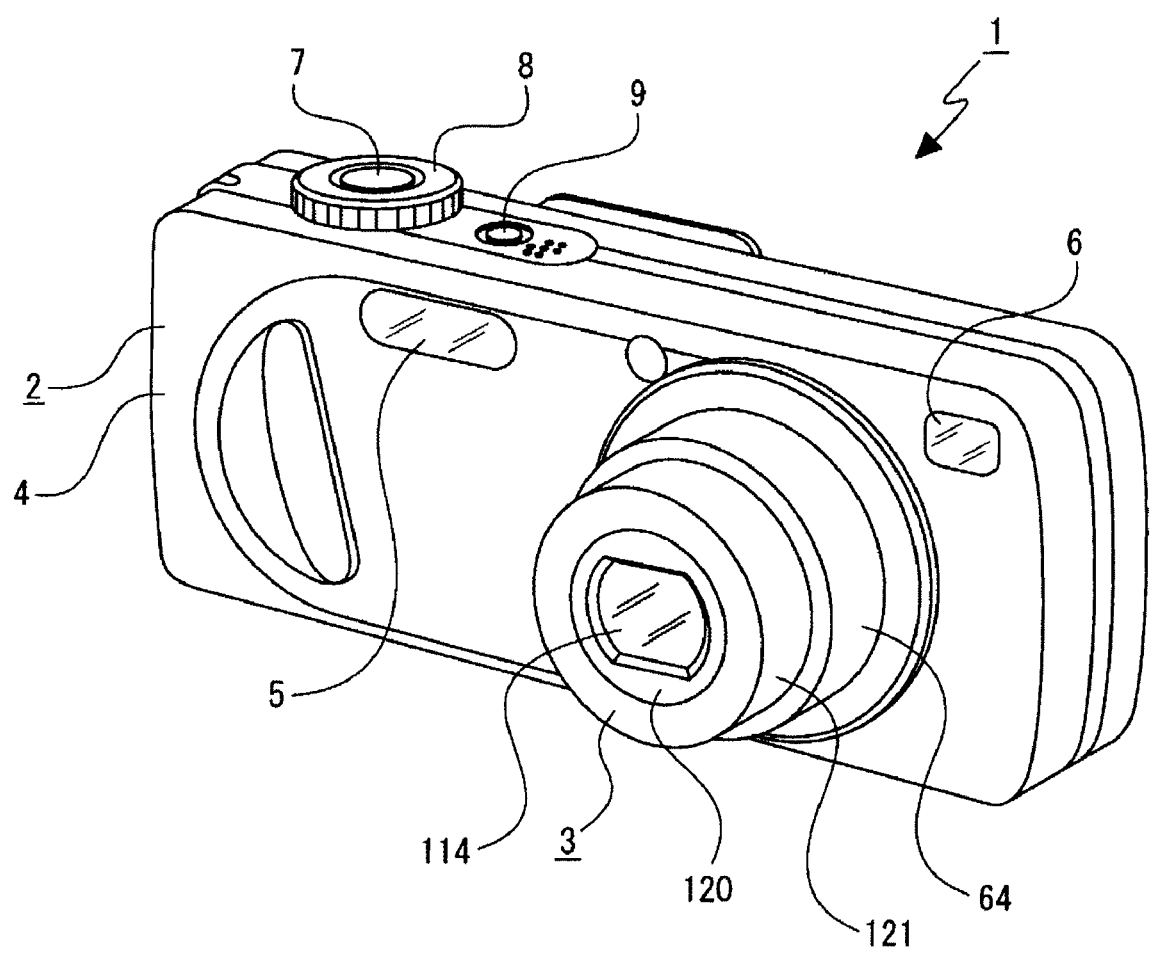
FIG. 2 is a perspective view of the image capture apparatus with the lens barrel projected from the apparatus body.

As shown in FIGS. 1 and 2, an image capture apparatus 1 includes an apparatus body 2, and a lens barrel 3 supported by the apparatus body 2 so as to be movable in a front-rear direction (an optical-axis direction). The lens barrel 3 is of a so-called retractable type, which is accommodated in the apparatus body 2 (see FIG. 1) e.g., during non-image taking, whereas it projects frontward from the apparatus body 2 (see FIG. 2), e.g., during image taking.

Having such a retractable type lens barrel 3, it is possible to compatibly realize miniaturization (thickness reduction) during non-image taking and the securing of good optical performance during image taking.

Figure 3:
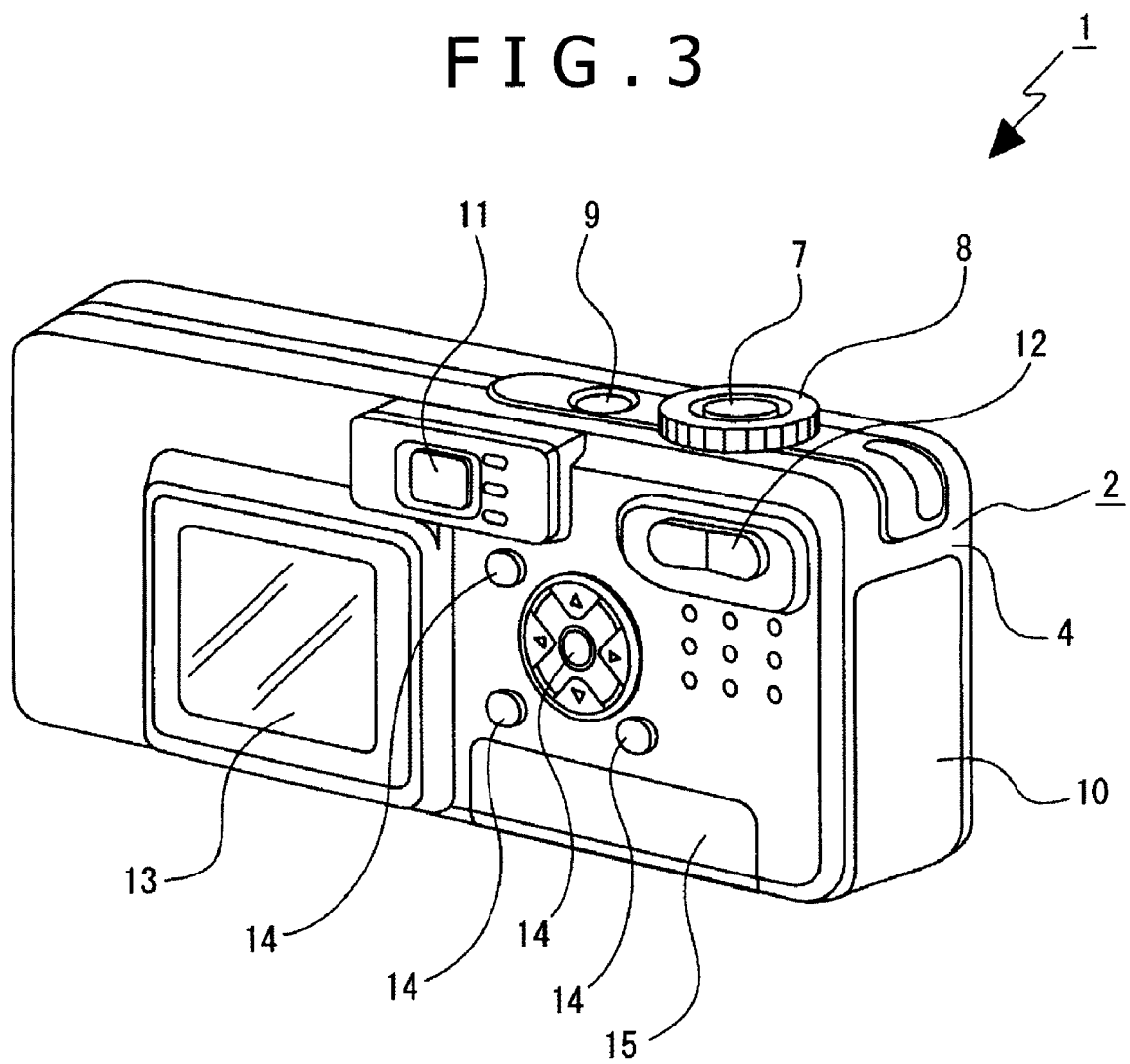
FIG. 3 is a perspective view of the image capture apparatus as viewed from a side opposite to a side shown in FIGS. 1 and 2.

The apparatus body 2 is formed such that various necessary components are arranged outside and inside a horizontally elongated, flat housing 4 (see FIGS. 1 to 3), for example.

On a front surface of the apparatus body 2 are a flash 5 and a viewfinder window 6. On a top surface of the apparatus body 2 are a shutter button 7, a mode switching dial 8, and a power button 9. On a side surface (right side surface) of the apparatus body 2 are a battery cover 10, which, through its opening/closing, allows a battery, not shown, to be set into/removed from the apparatus body 2. On a rear surface of the apparatus body 2 are a viewfinder 11, a zoom switch 12, a display screen 13, operation buttons 14, 14, ..., and a terminal cover 15.

Inside the terminal cover 15 are a power terminal, input/output terminals, and the like, all of which are not shown.

Figure 4:
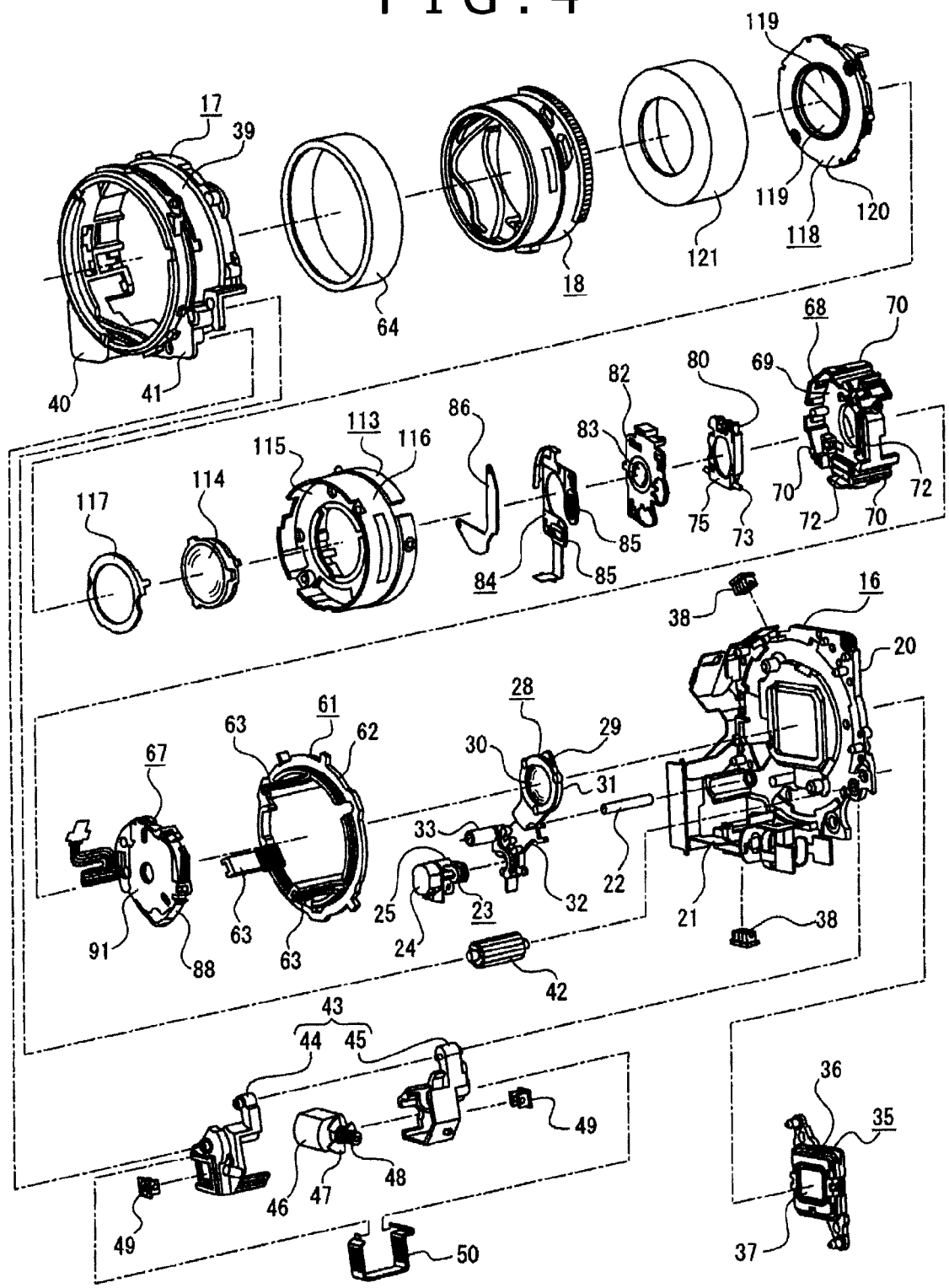
FIG. 4 is an exploded perspective view of the lens barrel.
Figure 5:
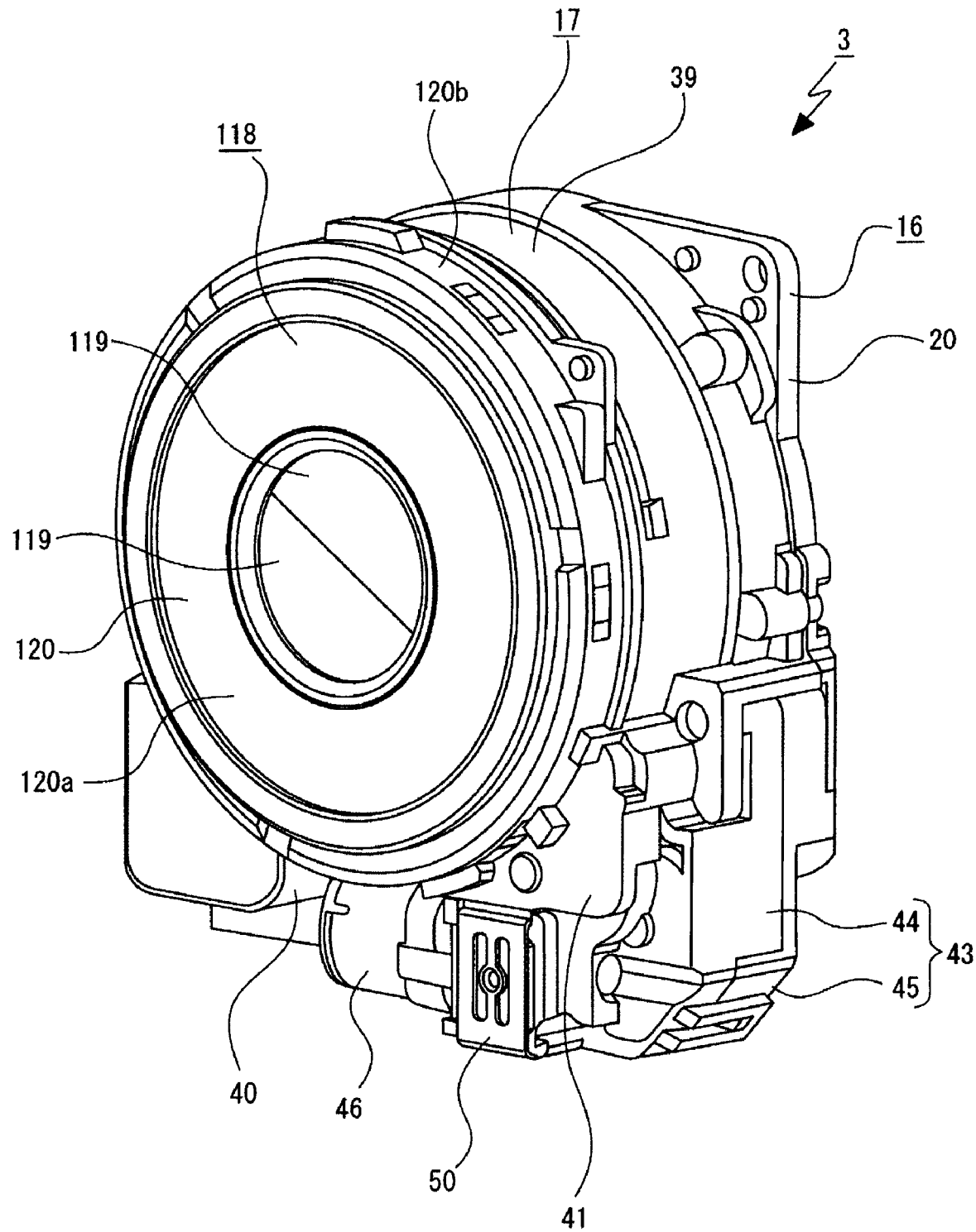
FIG. 5 is an enlarged perspective view of the lens barrel.
Figure 6:
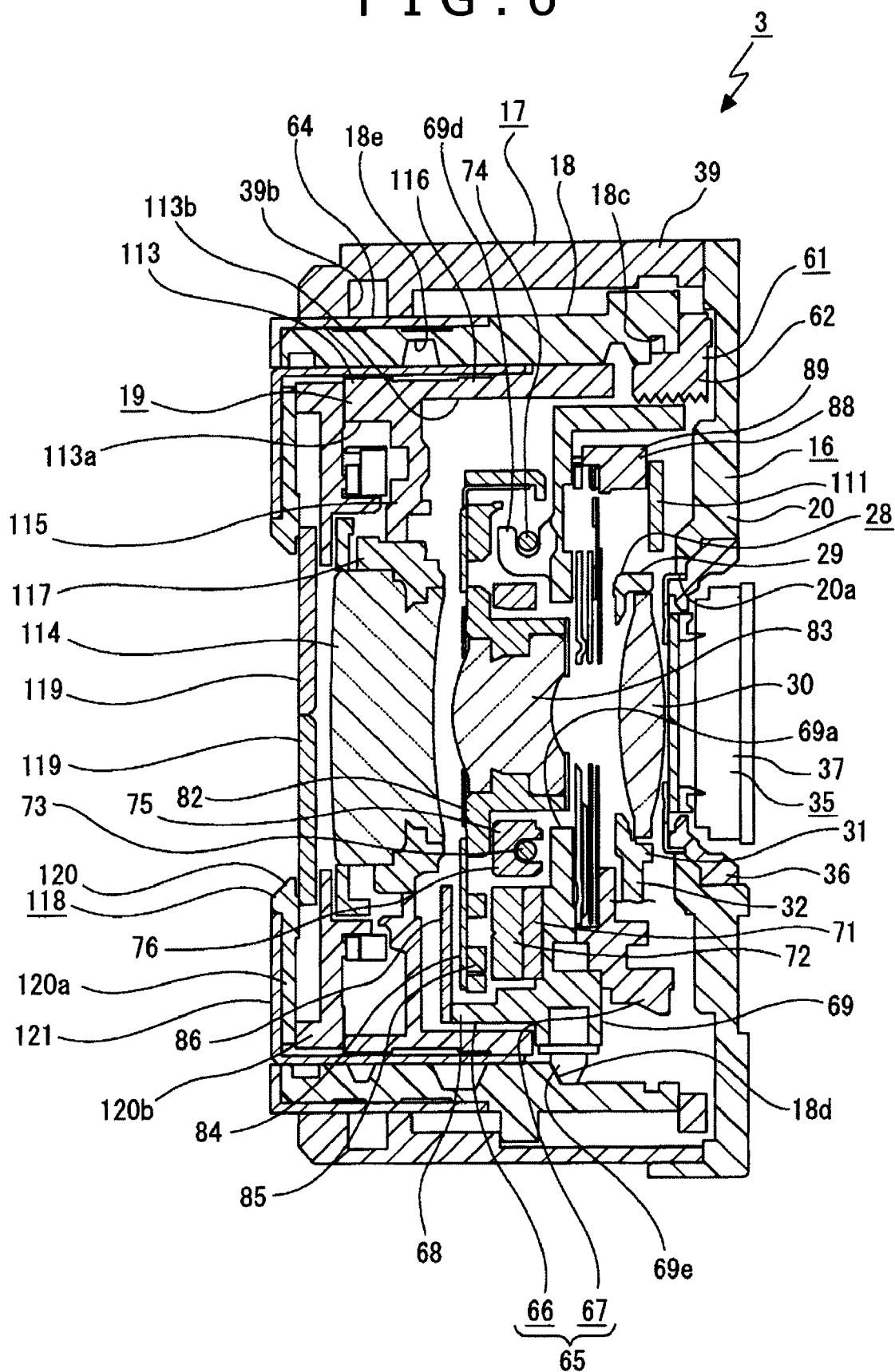
FIG. 6 is an enlarged sectional view of the lens barrel in a retracted position.

As shown in FIGS. 4 to 6, the lens barrel 3 includes a fixed member 16, a fixed ring 17 fixed to the fixed member 16, a cam cylinder 18 rotatably supported by the fixed ring 17, and a first movable unit 19 supported by the cam cylinder 18 so as to be movable in the front-rear direction (optical-axis direction).

Figure 7:
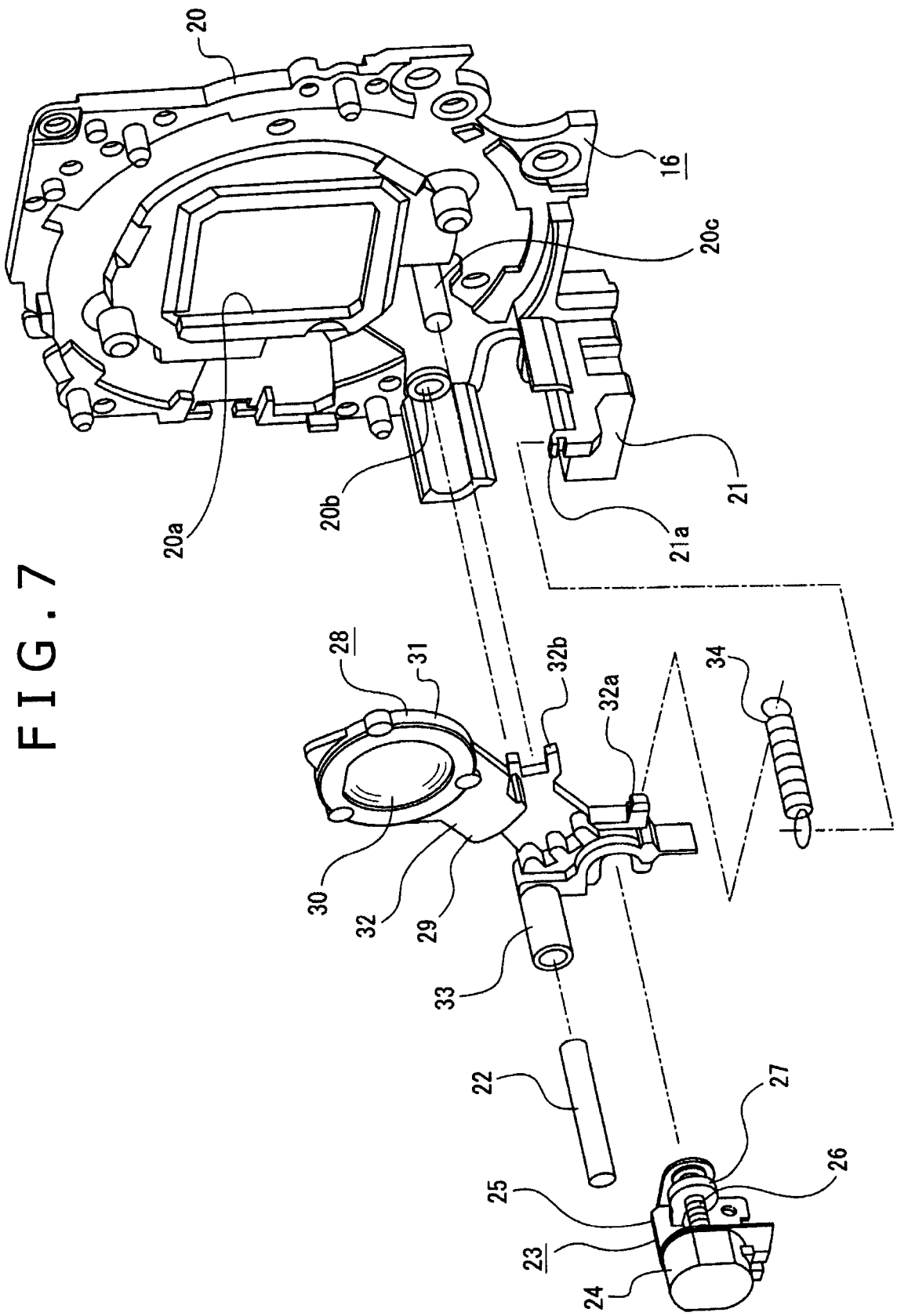
FIG. 7 is an enlarged exploded perspective view showing a fixing portion, a focus motor unit, and a focus moving unit.
Figure 8:
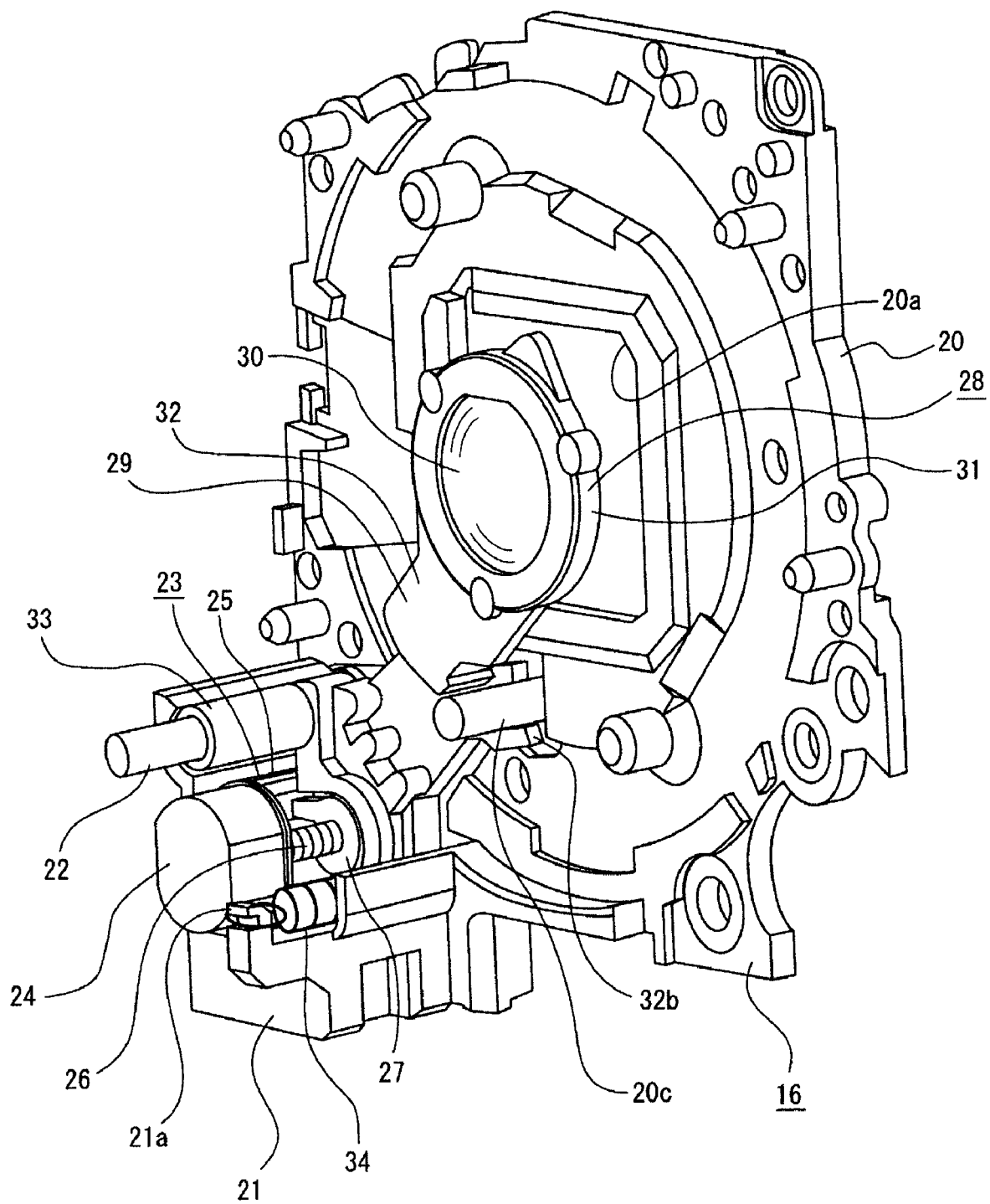
FIG. 8 is an enlarged perspective view showing a state in which the focus motor unit and the focus moving unit are supported by the fixing portion.

As shown in FIGS. 7 and 8, the fixed member 16 has a frontward/rearward facing, approximately plate-shaped board portion 20, and a mounting projection 21 projecting frontward from a lower end portion of the board portion 20.

An arrangement hole 20a passing through in the front-rear direction is formed in an approximate midsection of the board portion 20. A frontward opened bearing recess 20b is formed in a right end portion at a position closer to a lower end of the board portion 20. A frontward projecting guiding shaft portion 20c is provided at a position closer to a lower end of an approximate midsection as viewed in a left-right direction of the board portion 20.

An guiding shaft 22 is mounted onto the bearing recess 20b of the board portion 20.

A spring hooking strip 21a is provided on a front end portion of the mounting projection 21.

A focus motor unit 23 is mounted on the mounting projection 21. The focus motor unit 23 has a motor 24, a motor mounting plate 25, a leadscrew 26 serving as a motor shaft of the motor 24, and a nut member 27 screwed onto the leadscrew 26.

In the focus motor unit 23, the motor mounting plate 25 is mounted onto the mounting projection 21.

The focus motor unit 23 moves a focus moving unit 28 in the front-rear direction, i.e., in the optical-axis direction. The focus moving unit 28 is formed such that a focus lens group 30 is mounted on a holding arm 29.

The holding arm 29 has an annular lens mounting portion 31, a plate-shaped arm portion 32 projecting diagonally to the lower right from the lens mounting portion 31, and a supported cylindrical portion 33 projecting frontward from the arm portion 32.

The focus lens group 30 is mounted onto the lens mounting portion 31.

A spring hooking strip 32a is provided at a position closer to a lower end of the arm portion 32. A C-shaped supported strip 32b is provided on the arm portion 32.

The focus moving unit 28 is movably supported by the fixed member 16, by the supported cylindrical portion 33 being slidably supported by the guiding shaft 22 and by the supported strip 32b being slidably supported by the guiding shaft portion 20c. With the focus unit 28 supported by the fixed member 16, a part of the arm portion 32 is fixed by the nut member 27 of the focus motor unit 23, and a tension coil spring 34 is supported between the spring hooking strip 21a of the fixed member 16 and the spring hooking strip 32a of the focus moving unit 28. Accordingly, the focus moving unit 28 is urged frontward by the tension coil spring 34.

When the motor 24 of the focus motor unit 23 is started to rotate the leadscrew 26, the nut member 27 is moved in a direction responsive to a direction of rotation of the leadscrew 26, and the focus moving unit 28 is moved in the optical-axis direction, while guided by the guiding shaft 22 and the guiding shaft portion 20c.

An imager unit 35 is mounted onto the fixed member 16 from the rear (see FIG. 4). The imager unit 35 has a holding frame member 36, and an imager device 37, e.g., a CCD (Charge Coupled Device), held by the holding frame member 36. In the imager unit 35, the holding frame member 36 is mounted onto the fixed member 16, and the imager device 37 is arranged in the arrangement hole 20a of the fixed member 16 (see FIG. 6).

Photo interrupters 38 are mounted at predetermined positions of the fixed member 16 (see FIG. 4). The photo interrupters 38 perform position detection of the focus moving unit 28 in the optical-axis direction.

The fixed ring 17 is mounted onto the fixed member 16 from the front (see FIGS. 4 and 5). The fixed ring has an approximately cylinder-shaped cylindrical base portion 39, a unit pressing portion 40 projecting from a lower end portion on a right end side of the cylindrical base portion 39, and a case mounting portion 41 projecting from a lower end portion on a left end side of the cylindrical base portion 39.

Figure 9:
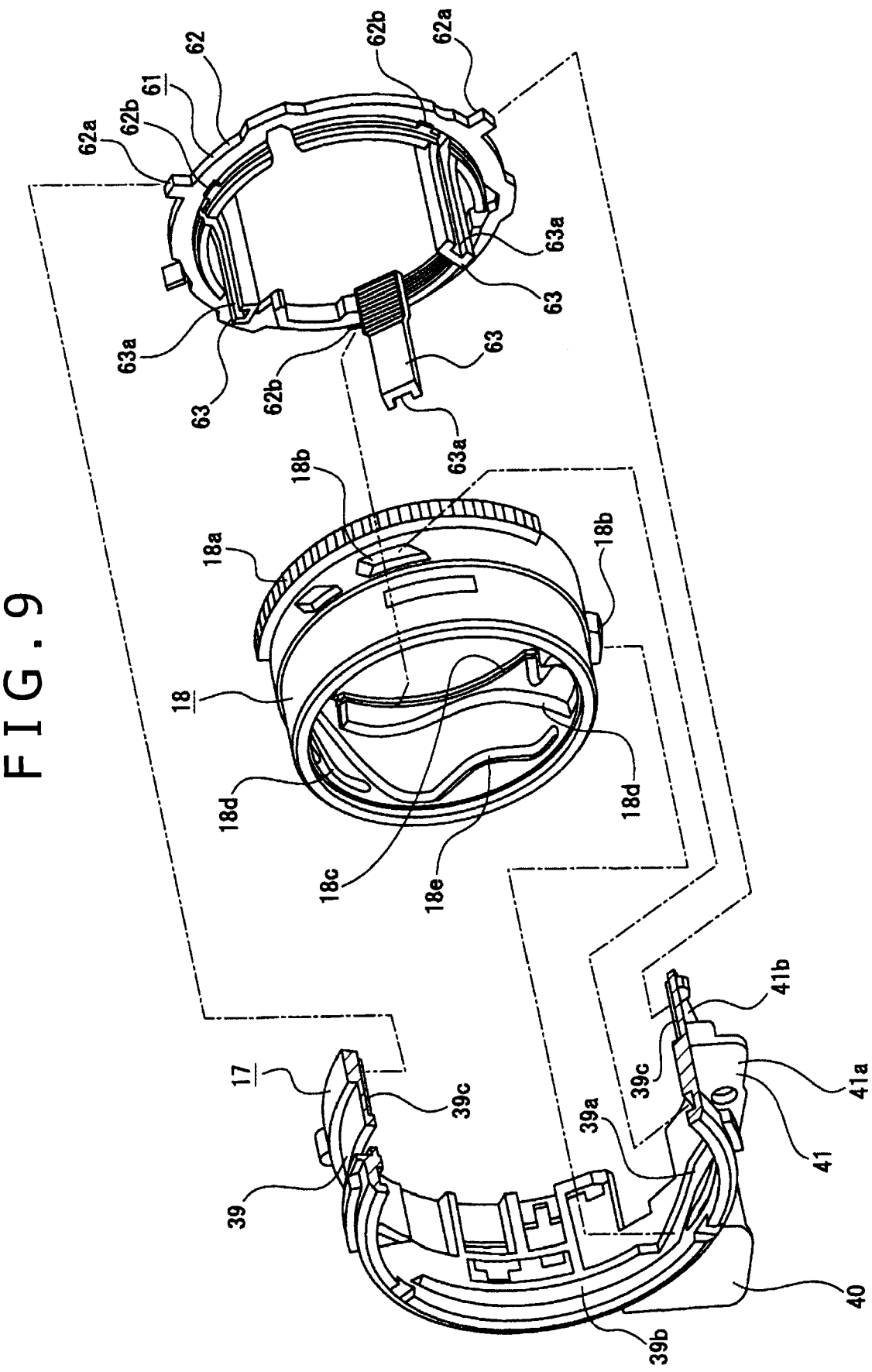
FIG. 9 is an enlarged exploded perspective view showing a fixed ring, a cum cylinder, and a linear guide.

In the cylindrical base portion 39, a gear arrangement hole, not shown, is formed at a position corresponding to the case mounting portion 41. As shown in FIG. 9, on an inner surface of the cylindrical base portion 39, linear inclined guiding grooves 39a, 39a, 39a and a rotation guiding groove 39b are formed continuously. The linear inclined guiding grooves 39a, 39a, 39a are spaced apart in a circumferential direction, and inclined in the front-rear direction. The rotation guiding groove 39b continues from front end portions of the linear inclined guiding grooves 39a, 39a, 39a, and extend in the circumferential direction.

Rearward opened linear guide groove 39c, 39c, 39c extending in the front-rear direction are also formed in the inner surface of the cylindrical base portion 39.

The case mounting portion 41 has a frontward/rearward facing front surface portion 41a positioned at a front end, and a leftward/rightward facing side surface portion 41b continuing from the front surface portion 41a. The case mounting portion 41 is formed so as to be opened downward and rearward.

With the fixed ring 17 mounted on the fixed member 16, the guiding shaft 22 is pressed from the front by the unit pressing portion 40, and the focus motor unit 23 is covered from the front.

Figure 10:
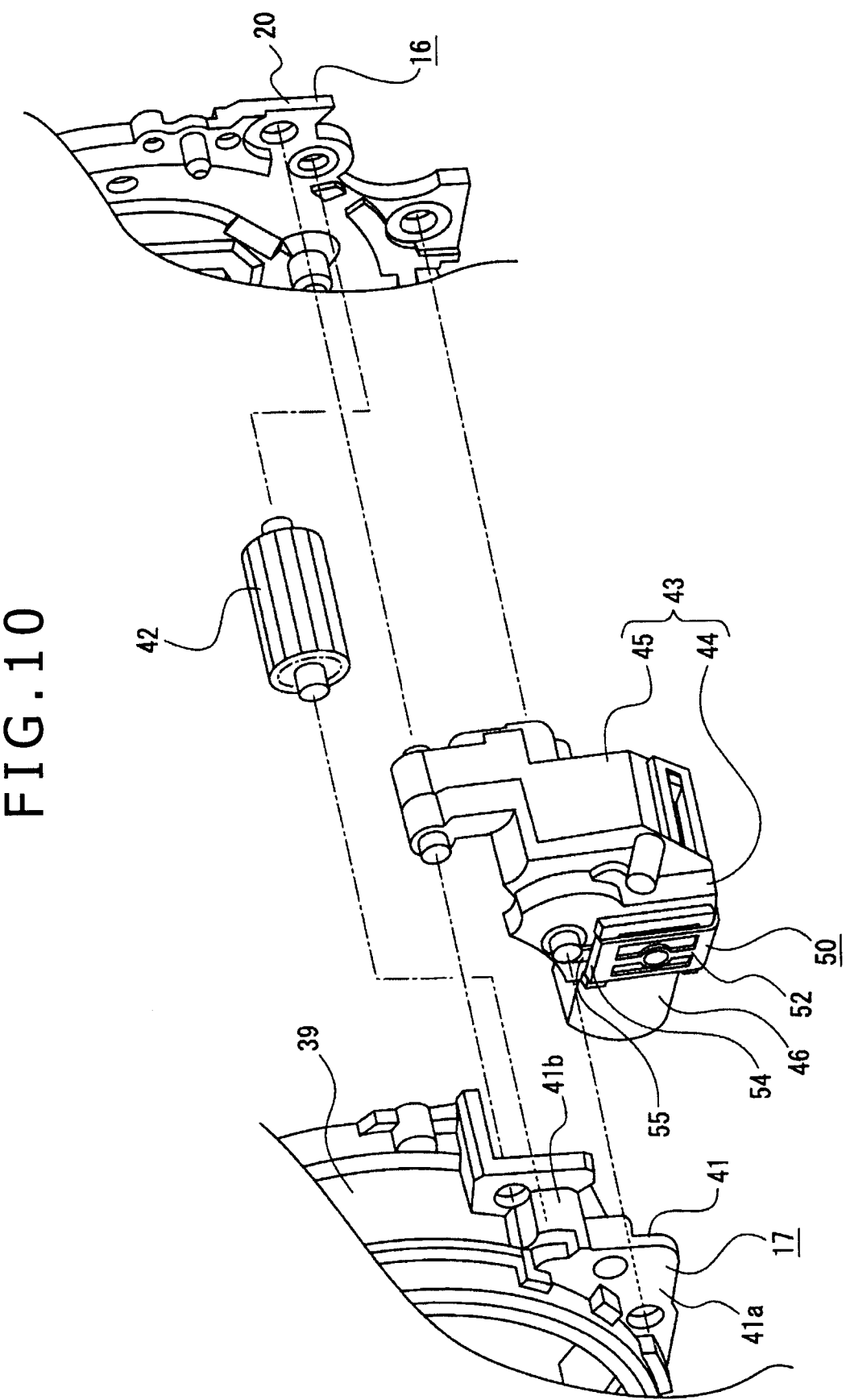
FIG. 10 is an enlarged exploded perspective view showing how a case body is mounted.

With the fixed ring 17 mounted on the fixed member 16, an axially elongated transmission gear 42 is rotatably supported between the front surface portion 41a of the case mounting portion 41 and the fixed member 16 (see FIG. 10). The transmission gear 42 is arranged in the gear arrangement hole of the cylindrical base portion 39.

Figure 12:
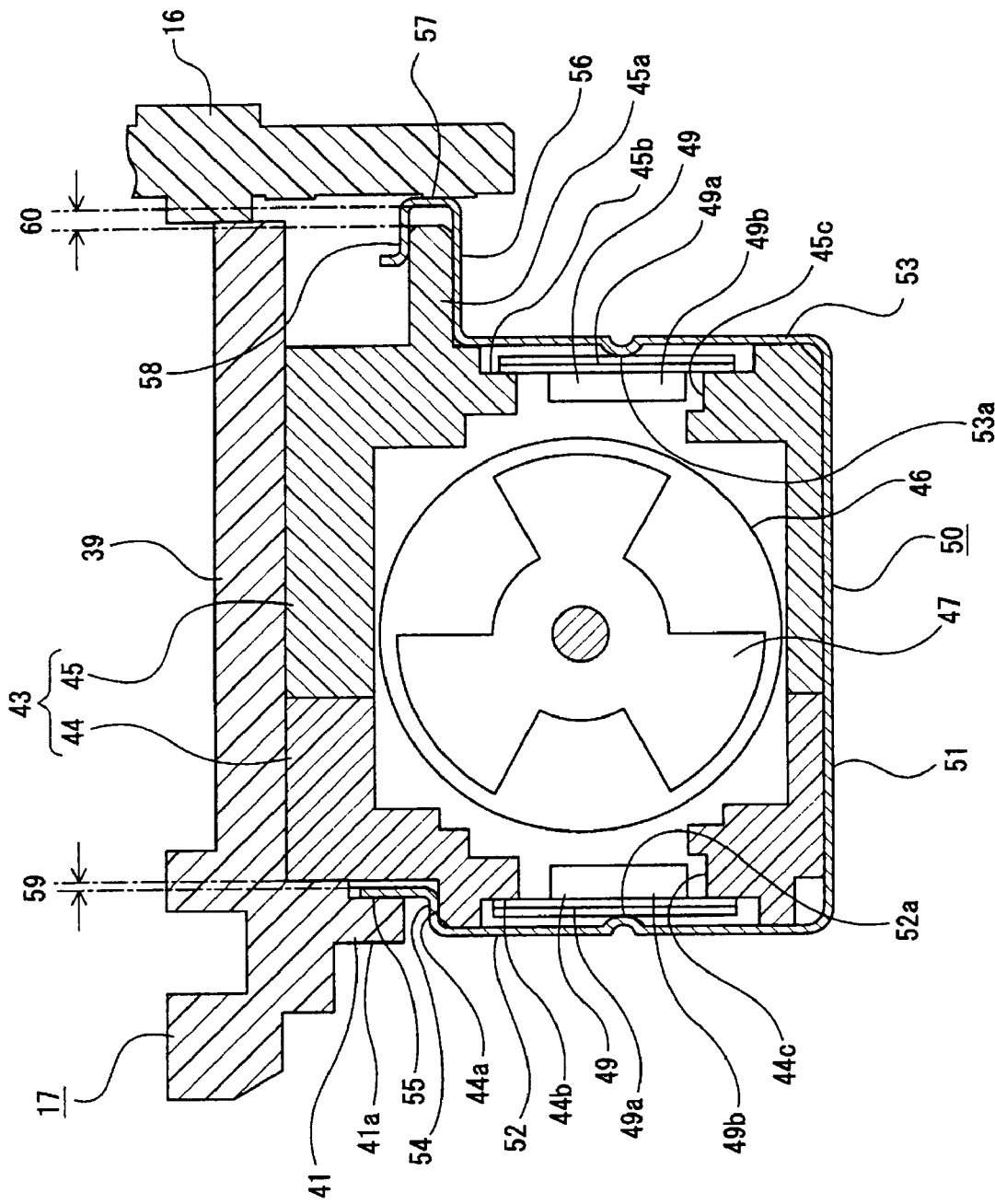
FIG. 12 is an enlarged sectional view showing how the case body is mounted.

A case body 43 is mounted onto the case mounting portion 41 of the fixed ring 17 (see FIGS. 4 and 5). As shown in FIGS. 10 and 12, the case body 43 is formed such that a front half 44 and a rear half 45 are coupled with each other.

In the front half 44, an upward facing mounting step 44a is formed at a position closer to an upper end of a front surface thereof. In the front half 44, a frontward opened, indented sensor mounting portion 44b is also provided. In the front half 44, a sensor arrangement hole 44c passing through in the front-rear direction is further formed in the sensor mounting portion 44b.

In the rear half 45, amounting projection 45a projecting rearward from a rear surface thereof is provided. In the rear half 45, a rearward opened, indented sensor mounting portion 45b is also provided. In the rear half 45, a sensor arrangement hole 45c passing through in the front-rear direction is further formed in the sensor mounting portion 45b.

A motor 46 is mounted onto the case body 43, and light-shielding blades 47 and a worm 48 are fixed to a motor shaft of the motor 46 (see FIG. 4). With the motor 46 arranged inside the case body 43, the motor shaft, the light-shielding blades 47, and the worm 48 are arranged inside the case body 43.

A transmission gear group, not shown, is arranged inside the case body 43. The transmission gear group is meshed with the worm 48 and the transmission gear 42.

When the motor 46 is started, the light-shielding blades 47 and the worm 48 are rotated along with the rotation of the motor shaft, and a driving force is transmitted to the transmission gear 42 from the worm 48 via the transmission gear group.

Figure 11:
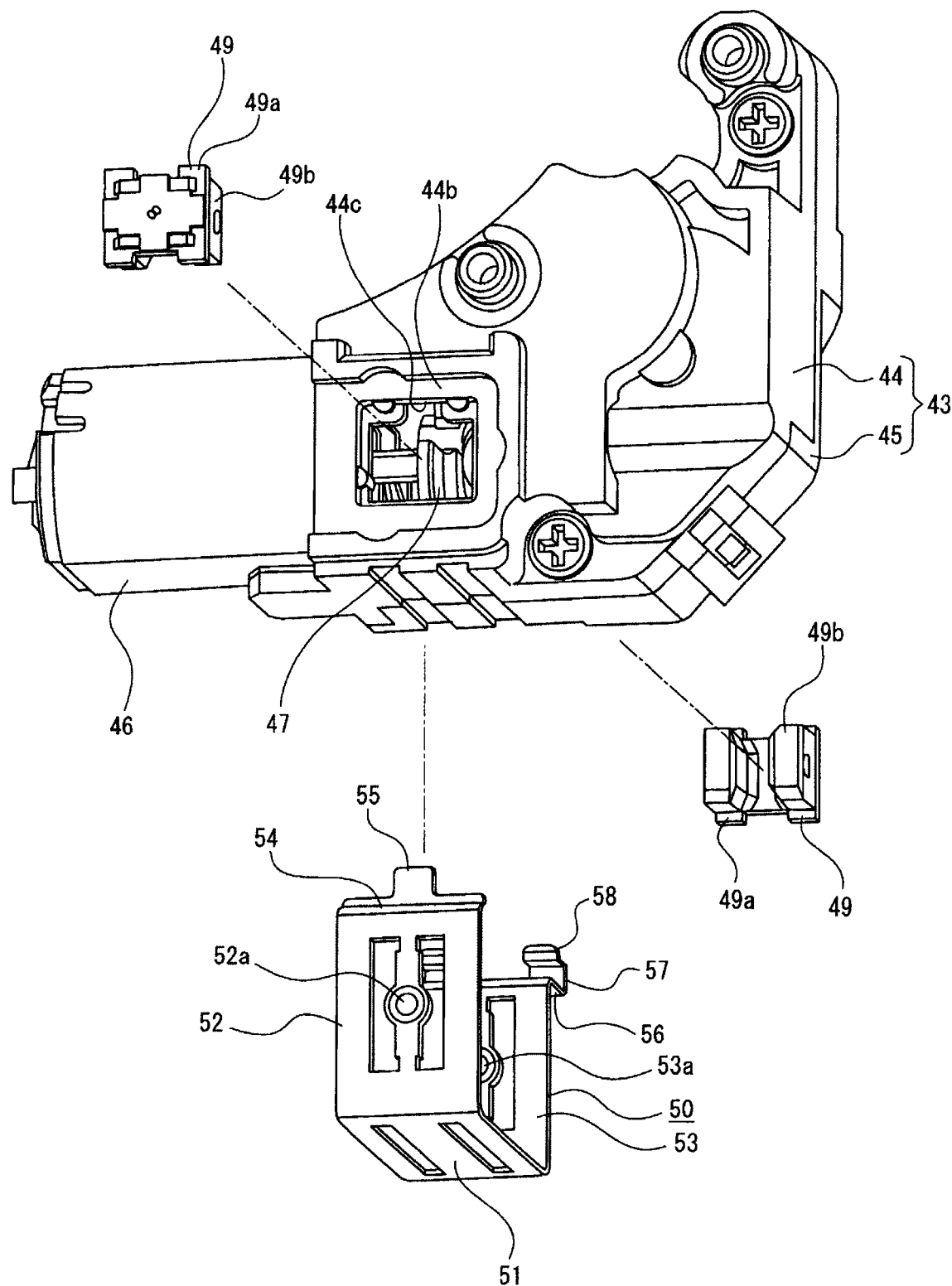
FIG. 11 is an enlarged exploded perspective view showing the case body and various members to be mounted thereto.

A pair of sensors 49, 49, e.g., photo interrupters, are mounted onto the case body 43. Each sensor 49 is formed such that a detecting body 49*b* is mounted on a substrate 49*a*. As shown in FIGS. 11 and 12, the sensors 49, 49 are mounted by amounting flat spring 50, with the substrates 49*a*, 49*a* pressed from outside toward the sensor mounting portions 44*b*, 45*b* of the case body 43, and with the detecting bodies 49*b*, 49*b* arranged into the sensor arrangement holes 44*c*, 45*c*, respectively.

The mounting flat spring 50 is formed such that an elongated, plate-shaped member is bent into a predetermined shape, and is formed of a lowermost, upward/downward facing base surface portion 51, sensor pressing portions 52, 53 projecting upward from both front and rear end edges of the base surface portion 51, an engaging portion 54 projecting rearward from an upper edge of the front-side sensor pressing portion 52, a pressed portion 55 projecting upward from a rear edge of the engaging portion 54, a joining portion 56 projecting rearward from an upper edge of the rear-side sensor pressing portion 53, pressed portions 57 projecting upward from a rear edge of the joining portion 56, and an engaging portion 58 projecting frontward from an upper edge of each pressed portion 57.

Embossed protrusions 52*a*, 53*a* protruding in directions nearing each other are provided on the sensor pressing portions 52, 53, respectively.

The mounting flat spring 50 is mounted onto the case body 43 by being elastically deformed such that the sensor pressing portions 52, 53 are widened in directions moving away from each other, and then elastically returned. With the mounting flat spring 50 mounted on the case body 43, the portions other than the pressed portions 55, 57 are brought into surface contact with external surfaces of the case body 43. At this instance, the substrates 49*a*, 49*a* of the sensors 49, 49 arranged in the sensor mounting portions 44*b*, 45*b* of the case body 43 are fixed while pressed by protrusions 52*a*, 53*a* of the mounting flat spring 50 from outside, respectively, thereby preventing the sensors 49, 49 from dropping off the case body 43.

In the mounting flat spring 50, the mounting projection 45*a* of the case body 43 is sandwiched between the joining portion 56 and the engaging portion 58, and the pressed portions 55, 57 are pressed by the fixed ring 17 and the fixed member 16 in directions nearing each other, respectively. At this instance, gaps 59, 60 are formed between the pressed portion 55 and a front surface of the front half 44 and between the pressed portion 57 and the mounting projection 45*a* of the rear half 45, respectively.

When the motor 46 is rotated, the light-shielding blades 47 are rotated, and the sensors 49, 49 detect switching between light shielding and light transmission along with the rotation of the light-shielding blades 47, thereby detecting the rotational direction and number of revolutions of the motor 46.

As described above, in the image capture apparatus 1, it is configured to fix the sensors 49, 49 to the case body 43 by the mounting flat spring 50 which has the sensor pressing portions 52, 53 for pressing the sensors 49, 49, respectively, the pressed portions 55, 57 which are pressed by the fixed ring 17 and the fixed member 16 in such directions as to near each other from outer surfaces, respectively, and the engaging portions 54, 58 which engage with the case body 43 in a direction orthogonal to the directions in which the pressed portions 55, 57 are pressed.

Accordingly, there is no need to use an adhesive for fixing the sensors 49, 49 to the case body 43, thereby avoiding occurrence of inconveniences, such as splashing and infiltration of the adhesive to lenses and other components during application.

In addition, time for hardening the adhesive and a special tool for applying the adhesive are not needed, thereby realizing reductions in the assembling time and cost.

Furthermore, maintenance work, such as the exchanging of the sensors 49, 49, can be readily performed by removing the mounting flat spring 50 from the case body 43, thereby improving maintainability.

Furthermore, in the image capture apparatus 1, the pressed portions 55, 57 are pressed by the fixed ring 17 and the fixed member 16, both of which sandwich the case body 43 therebetween, respectively, so that the members on which the case body 43 is mounted are shared as members for pressing the pressed portions 55, 57, thereby reducing the number of components by the sharing of components.

Furthermore, the pressing protrusions 52*a*, 53*a* protruding toward the sensors 49, 49 are provided on the sensor pressing portions 52, 53 of the mounting flat spring 50, respectively, thereby facilitating the holding of the sensors 49, 49 with respect to the case body 43.

In addition, the mounting flat spring 50 is mounted onto the case body 43 such that the gaps 59, 60 are formed between the pressed portions 55, 57 of the mounting flat spring 50 and outer surfaces of the case body 43, thereby facilitating the mounting of the mounting flat spring 50 onto the case body 43.

The cam cylinder 18 is supported by the fixed ring 17 so as to be movable in the front-rear direction as well as rotatable in the circumferential direction (see FIGS. 4, 6, and 9).

The cam cylinder 18 is approximately annular in shape, and has a rack gear 18*a* on part of a rear end portion of an outer circumferential surface thereof. On the outer circumferential surface of the cam cylinder 18, protrusions 18*b*, 18*b*, 18*b* to be guided are provided so as to be spaced apart in the circumferential direction.

In an inner circumferential surface of the cam cylinder 18, a support groove 18*c* extending in the circumferential direction is formed at a rear end portion thereof. In the inner circumferential surface of the cam cylinder 18, guide portions 18*d*, 18*d*, 18*d* and guiding portions 18*e*, 18*e*, 18*e*, each having a predetermined shape, are formed. The guide portions 18*d*, 18*d*, 18*d* and guiding portions 18*e*, 18*e*, 18*e* each are groove-shaped.

The cam cylinder 18 is movably supported by the fixed ring 17, by the protrusions 18*b*, 18*b*, 18*b* being slidably engaged with the linear inclined guiding grooves 39*a*, 39*a*, 39*a* or the rotation guiding groove 39*b*. The cam cylinder 18 moves in the front-rear direction while rotating when the protrusions 18*b*, 18*b*, 18*b* slide along the linear inclined guiding grooves 39*a*, 39*a*, 39*a*, whereas the cam cylinder 18 rotates without moving in the front-rear direction when the protrusions 18*b*, 18*b*, 18*b* slide along the rotation guiding groove 39*b*.

With the cam cylinder 18 supported by the fixed ring 17, the rack gear 18*a* is meshed with the transmission gear 42 which is rotatably supported between the fixed member 16 and the fixed ring 17. Accordingly, when the motor 46 held by the case body 43 is rotated, its driving force is transmitted to the rack gear 18*a* via the transmission gear group and the transmission gear 42, to rotate the cam cylinder 18 in a direction responsive to the rotational direction of the motor 46, whereby the cam cylinder 18 either moves in the front-rear direction while rotating, or rotates, with respect to the fixed ring 17.

The fixed ring 17 supports a linear guide 61 such that the guide 61 is movable in the front-rear direction. The linear guide 61 is formed such that an annular portion 62 is integrated with guide projections 63, 63, 63 which project frontward from the annular portion 62.

The annular portion 62 is provided with outward projecting projections 62a, 62a, 62c which are to be guided and spaced apart in the circumferential direction. The annular portion 62 is also provided with outward projecting supported projecting strips 62b, 62b, 62b which are spaced apart in the circumferential direction on a front side of the projections 62a, 62a, 62c, respectively.

The guide projections 63, 63, 63 have frontward and outward opened sliding grooves 63a, 63a, 63a formed therein, respectively.

The linear guide 61 is supported by the fixed ring 17 so as to be movable in the front-rear direction, by the projections 62a, 62a, 62a being slidably engaged with the linear guiding grooves 39c, 39c, 39c, respectively. The linear guide 61 is rotatable relative to the cam cylinder 18 by the supported projecting strips 62b, 62b, 62b being slidably engaged with the support groove 18c of the cam cylinder 18. Accordingly, when the cam cylinder 18 is rotated, since the projections 62a, 62a, 62c of the linear guide 61 are slidably engaged with the linear guiding grooves 39c, 39c, 39c, respectively, the cam cylinder 18 is rotated with respect to the linear guide 61, whereas when the cam cylinder 18 is moved in the front-rear direction with respect to the fixed ring 17, the linear guide 61 is moved in the front-rear direction integrally with the cam cylinder 18.

An accessory ring 64 is mounted onto a front half of the fixed ring 17 (see FIGS. 4 and 6).

The cam cylinder 18 supports a second movable unit 65 (see FIG. 6). The second movable unit 65 includes an intermediate movable unit 66 and a light amount adjusting device 67 mounted on the intermediate movable unit 66.

The intermediate movable unit 66 is formed such that required components are mounted on or supported by a base frame 68 (see FIGS. 13 through 16).

The base frame 68 has a circular plate portion 69, and supported surface portions 70, 70, 70 provided on an outer circumferential portion of the circular plate portion 69. The supported surface portions 70, 70, 70 are provided so as to be spaced apart in the circumferential direction.

A light-passing opening 69a passing through in the front-rear direction is formed at a midsection of the circular plate portion 69. Rearward projecting mounting frame portions 69b, 69b, 69b are provided along an outer edge of the circular plate portion 69. The mounting frame portions 69b, 69b, 69b are spaced apart in the circumferential direction and positioned between adjacent ones of the supported surface portions 70, 70, 70, respectively.

On a front surface of the circular portion 69, bearing portions 69c, 69c are provided below the light-passing opening 69a, and a bearing portion 69d is provided above the light-passing opening 69a. The bearing portions 69c, 69c are spaced apart in the left-right direction.

On the outer circumferential surface of the circular plate portion 69, guided portions 69e, 69e, 69e are provided which are spaced apart in the circumferential direction and project outward.

In the supported surface portions 70, 70, 70 of the base frame 68, supported groove portions 70a, 70a, 70a are formed which extend in the front-rear direction, respectively.

Flat yokes 71, 71, 71 are fixed to the circular portion 69 with, e.g., an adhesive. The yokes 71, 71 are fixed to a position closer to a lower end and to a position closer to a left end on the front surface of the circular portion 69, respectively. Driving magnets 72, 72 are fixed onto front surfaces of the yokes 71, 71, respectively.

Figure 13:
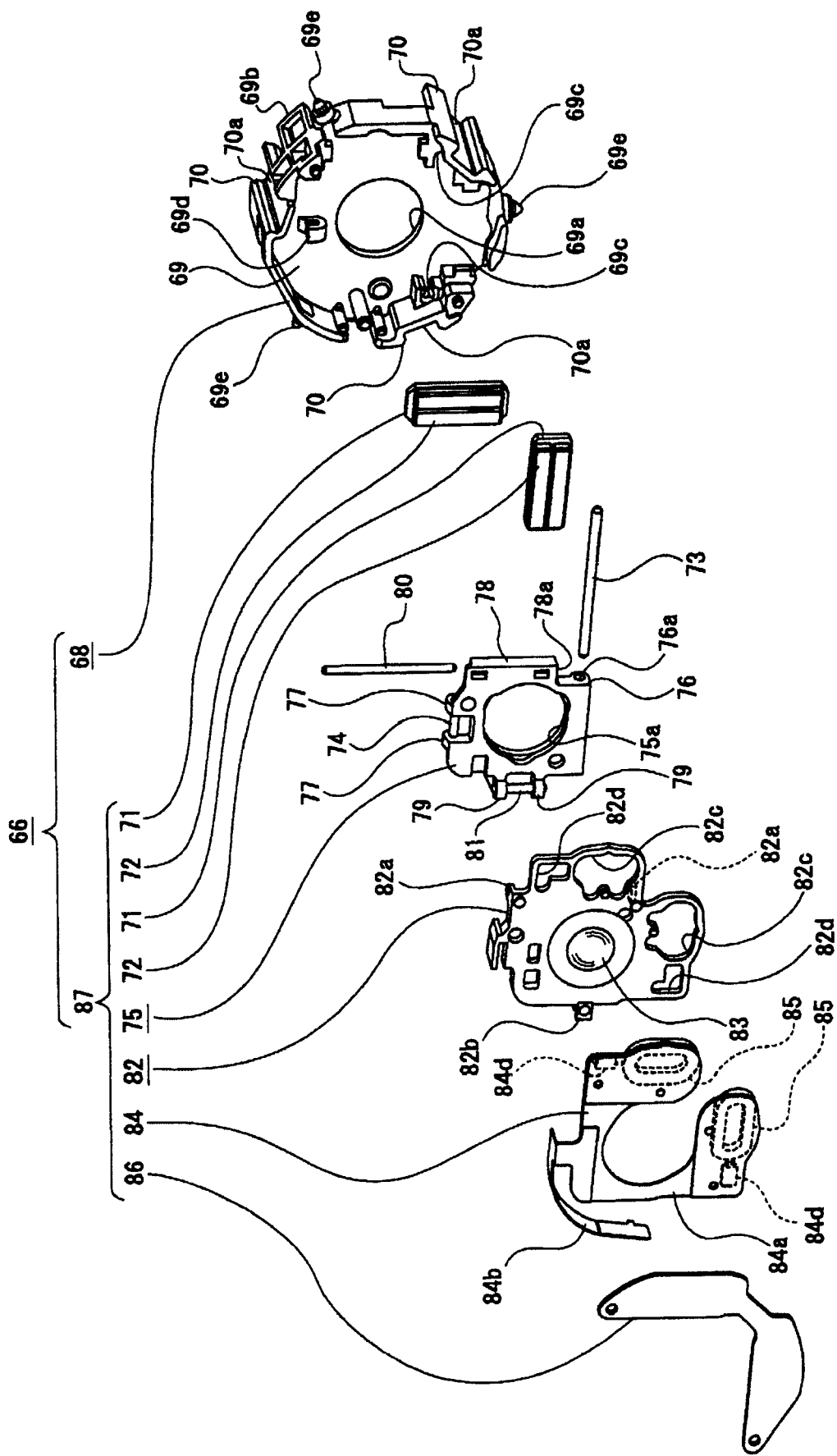
FIG. 13 is a diagram showing, along with FIGS. 14 through 16, an intermediate movable unit, FIG. 13 being an exploded perspective view of an entire part thereof.
Figure 14:
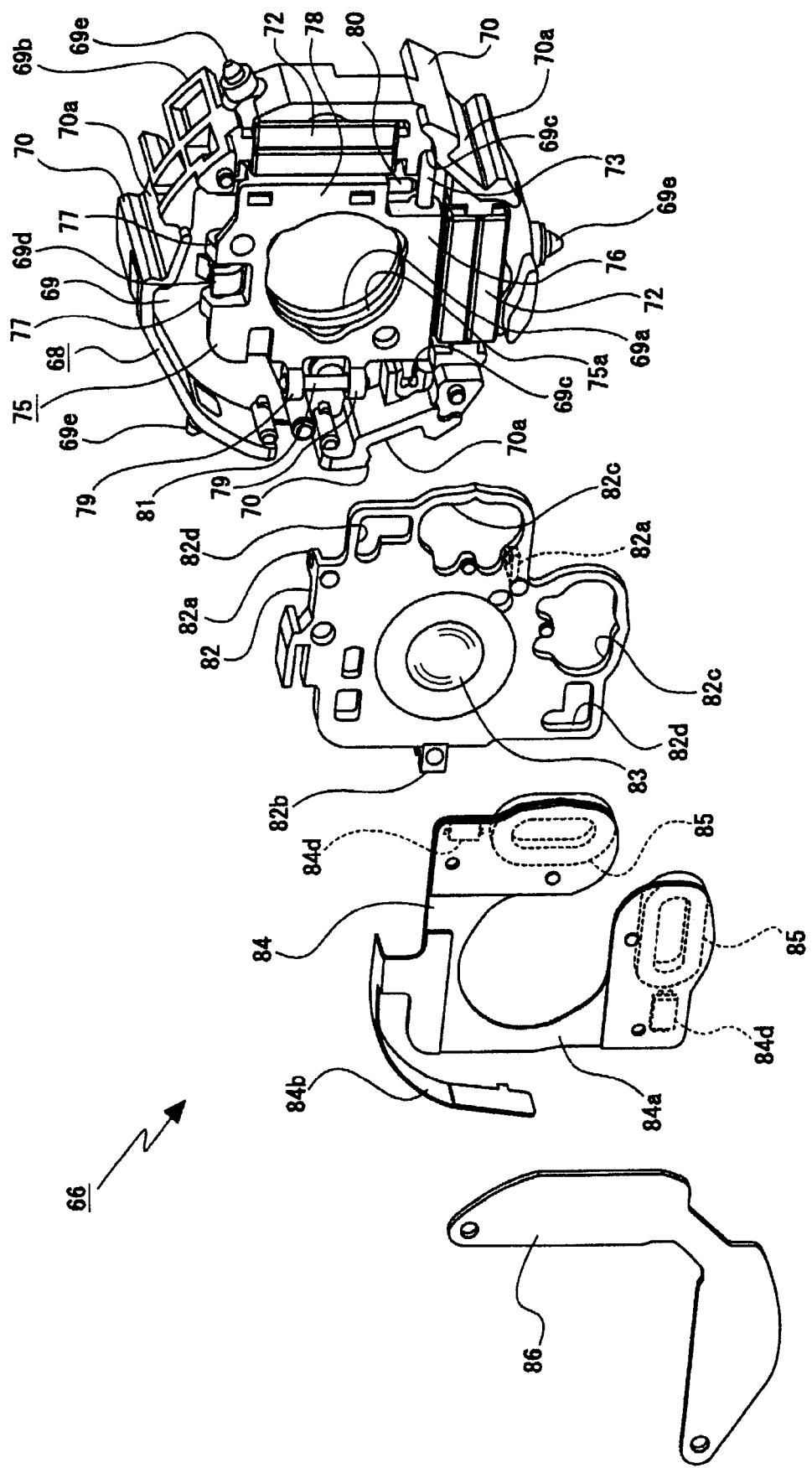
FIG. 14 is an enlarged exploded perspective view showing a state in which a first correcting moving frame is supported by a base frame.

On the front surface side of the base frame 68, a first correcting moving frame 75 is supported so as to be movable in the left-right direction (a first direction) via a first guide shaft 73 and a first sub-guide shaft 74 (see FIGS. 13 and 14).

The first correcting moving frame 75 has a light-passing hole 75a formed at a midsection thereof. The first correcting moving frame 75 is provided with a first shaft support portion 76 at a lower end portion thereof, first sub-guide support portions 77, 77 at an upper end portion thereof, a second shaft support portion 78 at a left end portion thereof, and second sub-shaft support portions 79, 79 at a right end portion thereof. The first shaft support portion 76 has a first throughhole 76a formed therein which passes through in the left-right direction, and the second shaft support portion 78 has a second throughhole 78a formed therein which passes through in an up-down direction.

Figure 17:
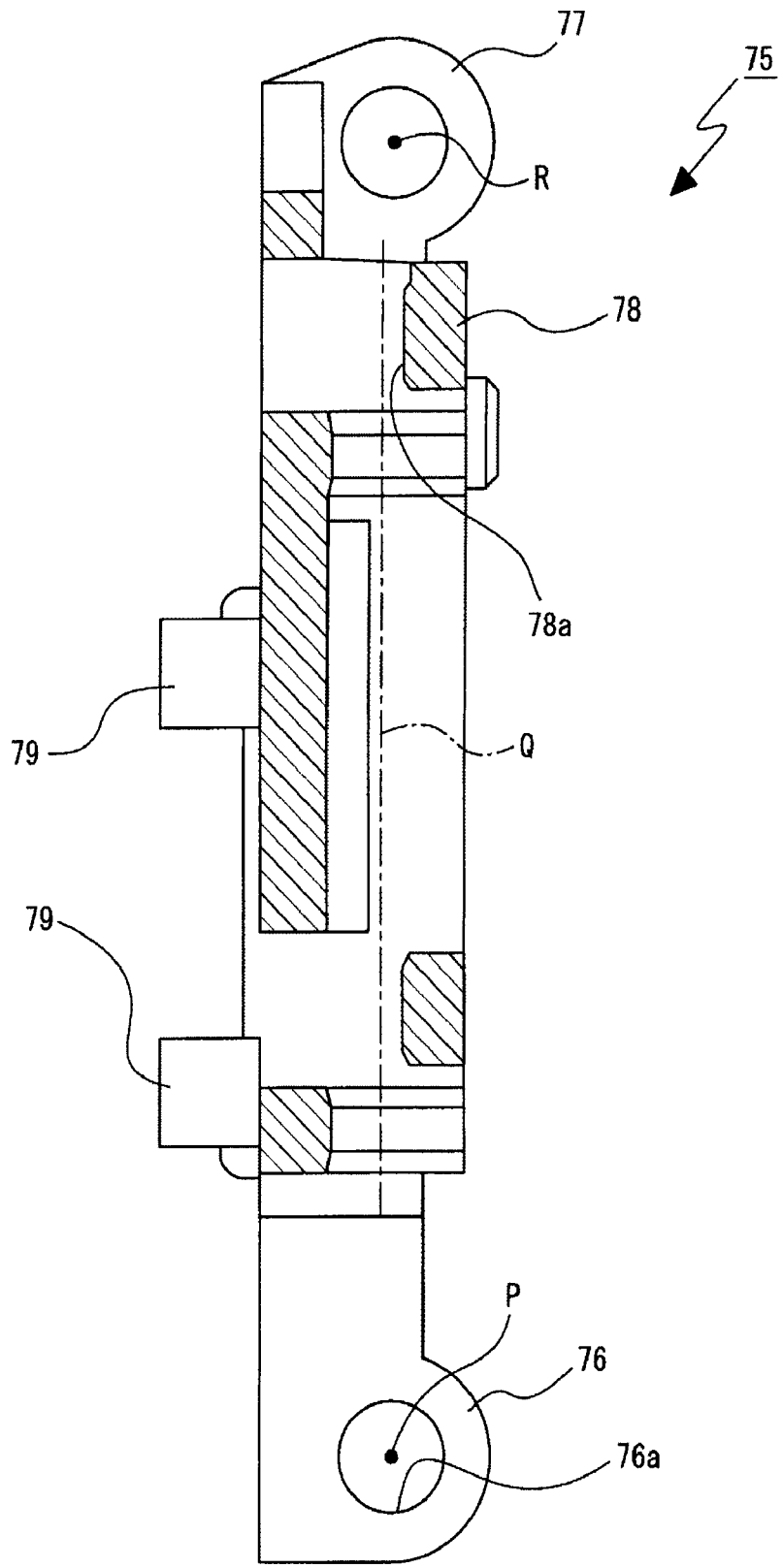
FIG. 17 is an enlarged sectional view of the first correcting moving frame.

As shown in FIG. 17, any of a center P of the first throughhole 76a of the first shaft support portion 76, a center Q of the second throughhole 78a of the second shaft support portion 78, and a center R of holes of the first sub-shaft support portions 77, 77 is positioned in substantially the same plane which is orthogonal to an optical axis, and the second sub-shaft support portions 79, 79 are positioned further frontward than the first shaft support portion 76, the second shaft support portion 78, and the first sub-shaft support portions 77, 77.

The first guide shaft 73 is slidably inserted into the first throughhole 76a of the first shaft support portion 76. The first sub-guide shaft 74 is fixed to the first sub-shaft support portions 77, 77. A second guide shaft 80 is fixed to the second throughhole 78a of the second shaft support portion 78 by, e.g., force fit. A second sub-guide shaft 81 is fixed to the second sub-shaft support portions 79, 79.

The first correcting moving frame 75 is supported by the base frame 68 movably in the left-right direction, by both end portions of the first guide shaft 73 being fixed to the bearing portions 69c, 69c, and a middle part of the first sub-guide shaft 74 being slidably supported by the bearing portion 69d. Accordingly, the first correcting moving frame 75 is moved in the left-right direction while sliding with respect to the first guide shaft 73.

As described above, the center P of the first throughhole 76a of the first shaft support portion 76 and the center Q of the second throughhole 78a of the second shaft support portion 78 are positioned in substantially the same plane which is orthogonal to the optical axis, so that a shaft center of the first guide shaft 73 and a shaft center of the second guide shaft 80 inserted into these throughholes, respectively, are also positioned in substantially the same plane which is orthogonal to the optical axis.

Figure 18:
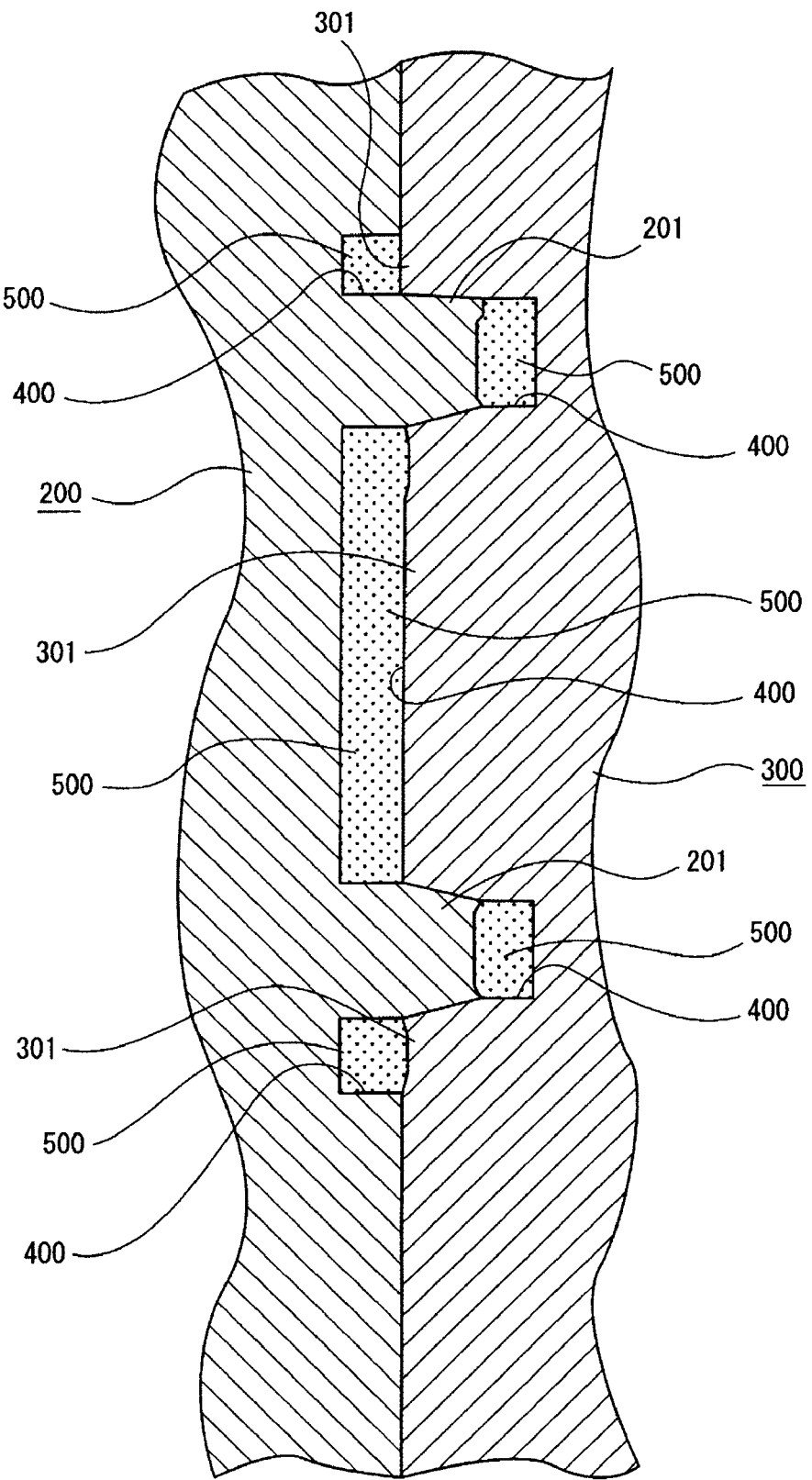
FIG. 18 is a diagram showing, along with FIG. 19, a procedure for molding the first correcting moving frame, FIG. 18 being an enlarged sectional view showing a state in which a first mold and a second mold are abutted to form cavities and resin melts are charged into the cavities.
Figure 19:
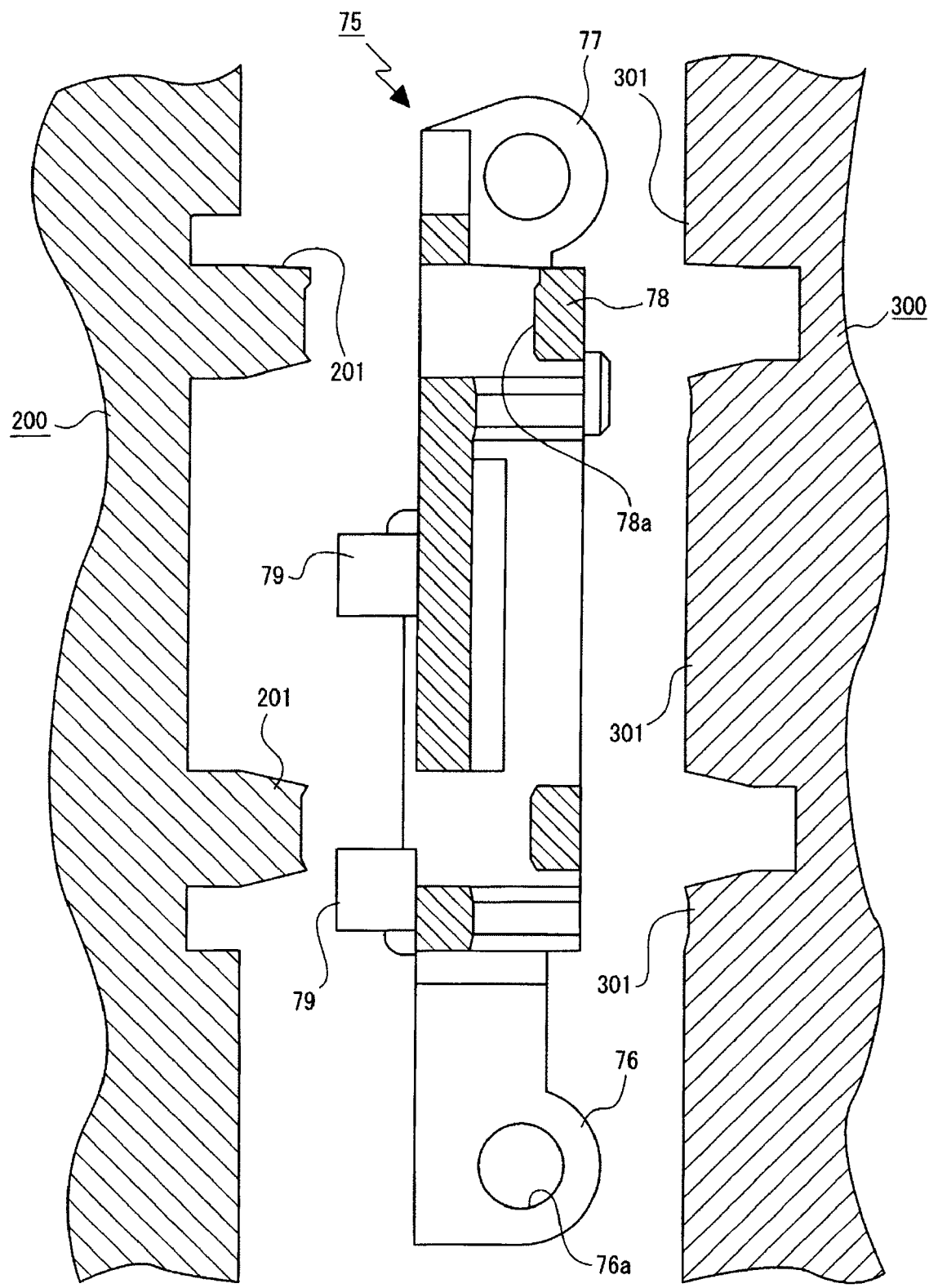
FIG. 19 is an enlarged sectional view showing a state in which the first mold and the second mold are separated from each other to form the first correcting moving frame.

The first correcting moving frame 75 is formed by injection molding, and the second shaft support portion 78 is formed by a first mold 200 and a second mold 300 which are separated in the optical-axis direction (see FIGS. 18 and 19).

The first mold 200 is provided with rearward projecting throughhole forming projections 201, 201, . . . , which are spaced apart in the up-down direction.

The second mold 300 is provided with frontward projecting throughhole forming projections 301, 301, . . . , which are spaced apart in the up-down direction.

The first mold 200 and the second mold 300 are abutted with each other in the front-rear direction, to form cavities 400, 400, . . . (see FIG. 18). At this instance, the throughhole forming projections 201, 201, . . . of the first mold 200 are brought into contact with the throughhole forming projections 301, 301, . . . of the second mold 300 so as to alternate with each other in the up-down direction.

Resin melts 500, 500, . . . are charged into the cavities 400, 400, . . . , and after the resin melts 500, 500, . . . harden, the first mold 200 is separated from the second mold 300, thereby forming the first correcting moving frame 75 (see FIG. 19). The second throughhole 78a of the second shaft support portion 78 is formed into a so-called "pinch-off" shape by the throughhole forming projections 201, 201, and the throughhole forming projections 301, 301, which are in contact with each other alternately.

In this way, the second throughhole 78a of the second shaft support portion 78 can be easily formed into the pinch-off shape with the first mold 200 and the second mold 300, thereby facilitating the fabrication of the first correcting moving frame 75 and reducing its manufacturing cost.

In addition, by forming the second throughhole 78a into the pinch-off shape, the second throughhole 78a can be formed with high accuracy using a simple mold configuration.

While an example is disclosed above in which the second throughhole 78a of the second shaft support portion 78 is formed into the pinch-off shape with the first mold 200 and the second mold 300, the first throughhole 76a of the first shaft support portion 76 may be formed into a pinch-off shape using two molds. In addition, both the first throughhole 76a and the second throughhole 78a can be formed into a pinch-off shape, each using two molds. Furthermore, the first sub-shaft support portions 77, 77 and the second sub-shaft support portions 79, 79 can also be formed into a pinch-off shape.

Figure 15:
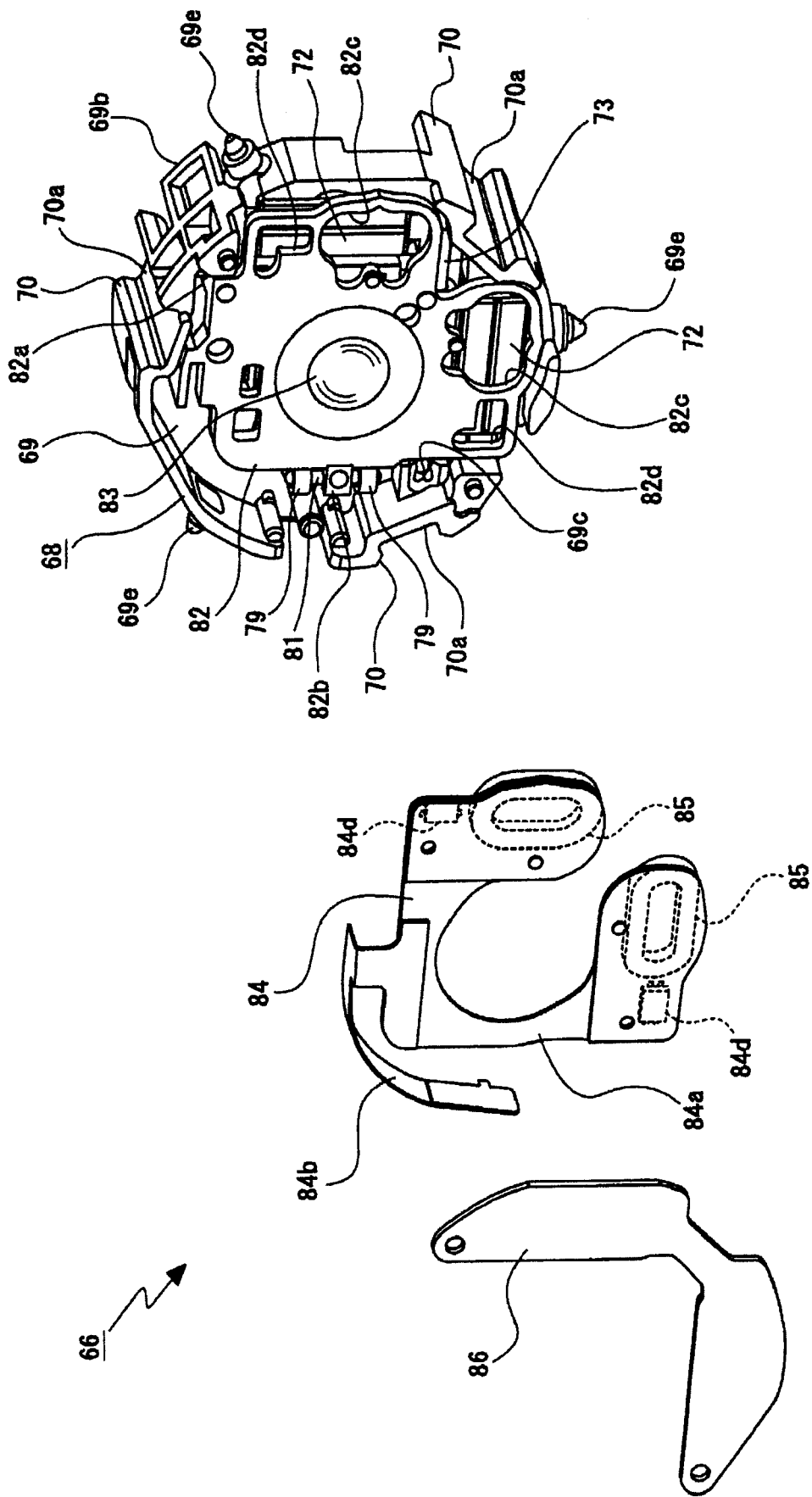
FIG. 15 is an enlarged exploded perspective view showing a state in which the first correcting moving frame and a second correcting moving frame are supported by the base frame.

The first correcting moving frame 75 supports a second correcting moving frame 82 such that the second correcting moving frame 82 is movable in the up-down direction (a second direction) (see FIGS. 14 and 15).

A lens group 83 is mounted in an approximate midsection of the second correcting moving frame 82. The second correcting moving frame 82 is provided with rearward projecting supported cylindrical portions 82a, 82a which are spaced apart in the up-down direction at positions closer to a left end, and a rightward projecting supported projection 82b at a right end portion.

The second correcting moving frame 82 has large openings 82c, 82c passing through in the front-rear direction formed at a left end portion and a bottom end portion, respectively, and has small openings 82d, 82d formed near the large openings 82c, 82c, respectively.

In the second correcting moving frame 82, the supported cylindrical portions 82a, 82a are slidably supported by both end portions of the second guide shaft 80, and the supported projection 82b is slidably supported by a middle part of the second sub-shaft 81. Accordingly, the second correcting moving frame 82 is movable in the up-down direction with respect to the first correcting moving frame 75, and is moved in the left-right direction integrally with the first correcting moving frame 75 when the first correcting moving frame 75 is moved in the left-right direction.

With the second correcting moving frame 82 supported by the first correcting moving frame 75, the large openings 82c, 82c are positioned on a front side of the driving magnets 72, 72 fixed to the base frame 68, respectively.

A circuit board 84 is mounted on a front surface of the second correcting moving frame 82 (see FIGS. 15 and 16). The circuit board 84 includes a frontward/rearward facing base surface portion 84a, and a first connecting surface portion 84b projecting from an upper end portion of the base surface portion 84a.

The base surface portion 84a is provided with driving coils 85, 85 integrally therewith at a lower end portion and a left end portion, respectively. Hall sensors 84d, 84d are mounted onto the base surface portion 84a near the driving coils 85, 85, for performing position detection of the first correcting moving frame 75 and the second correcting moving frame 82.

Circuit wires, not shown, are formed on the first connecting surface portion 84b, and various circuit wires are connected to the driving coils 85, 85.

In the circuit board 84, the base surface portion 84a is mounted on the front surface of the second correcting moving frame 82 with an adhesive or the like, and the first connecting surface portion 84b is connected to respective power driving circuits, not shown. With the circuit board 84 mounted on the front surface of the second correcting moving frame 82, the driving coils 85, 85 are positioned inside the large openings 82c, 82c of the second correcting moving frame 82, and the Hall sensors 84d, 84d are positioned inside the small openings 82d, 82d of the second correcting moving frame 82, respectively.

As described above, with the first correcting moving frame 75 supported by the base frame 68 to which the driving magnets 72, 72 are fixed, with the second correcting moving frame 82 supported by the first correcting moving frame 75, and with the circuit board 84 mounted on the second correcting moving frame 82, an approximately L-shaped outer yoke 86 is mounted onto the front surface of the base frame 68 with an adhesive or the like, thereby forming the intermediate movable unit 66 (see FIG. 16).

A blur correction mechanism 87 is formed of the above-mentioned yokes 71, 71, driving magnets 72, 72, first correcting moving frame 75, first guide shaft 73, first sub-guide shaft 74, second guide shaft 80, second sub-guide shaft 81, second correcting moving frame 82, driving coils 85, 85, and outer yoke 86 (see FIG. 13).

When the power driving circuits supply driving currents to the driving coils 85, 85 in the blur correction mechanism 87, a thrusting force occurs in a predetermined direction by the driving coils 85, 85 and the driving magnets 72, 72 responsive to the directions of the supplied driving currents, and by this thrusting force, the first correcting moving frame 75 and the second correcting moving frame 82 holding the lens group 83 therein are moved integrally in the left-right direction (first direction) while guided by the first guide shaft 73 and the first sub-guide shaft 74. In addition, by this thrusting force, the second correcting moving frame 82 holding the lens group 83 therein is moved in the up-down direction (second direction) while guided by the second guide shaft 80 and the second sub-guide shaft 81. As a result, the lens group 83 is moved within a plane orthogonal to the optical axis, thereby correcting a focal position to prevent image blurring.

It is noted that the magnets 72, 72 also function as magnets for position-detecting the Hall sensors 84d, 84d, and are formed so as to extend in a predetermined direction to face both the driving coils 85, 85 as well as the Hall sensors 84d, 84d.

When the blurring correcting operation is performed as mentioned above, the second correcting moving frame 82 is slid with respect to both end portions of the second guide shaft 80. Thus, in the blur correction mechanism 87, it is configured to fix the portion other than both end portions of the second guide shaft 80 to the second shaft support portion 78 of the first correcting moving frame 75, and to move the second correcting moving frame 82 with respect to both end portions of the second guide shaft 80, which means gaps for sliding are formed with respect to the supported cylindrical portions 82a, 82a on a side of both end portions of the second guide shaft 80. Consequently, play is hard to occur during movement of the second correcting moving frame 82, thereby improving the reliability of the blurring correcting operation.

Figure 20:
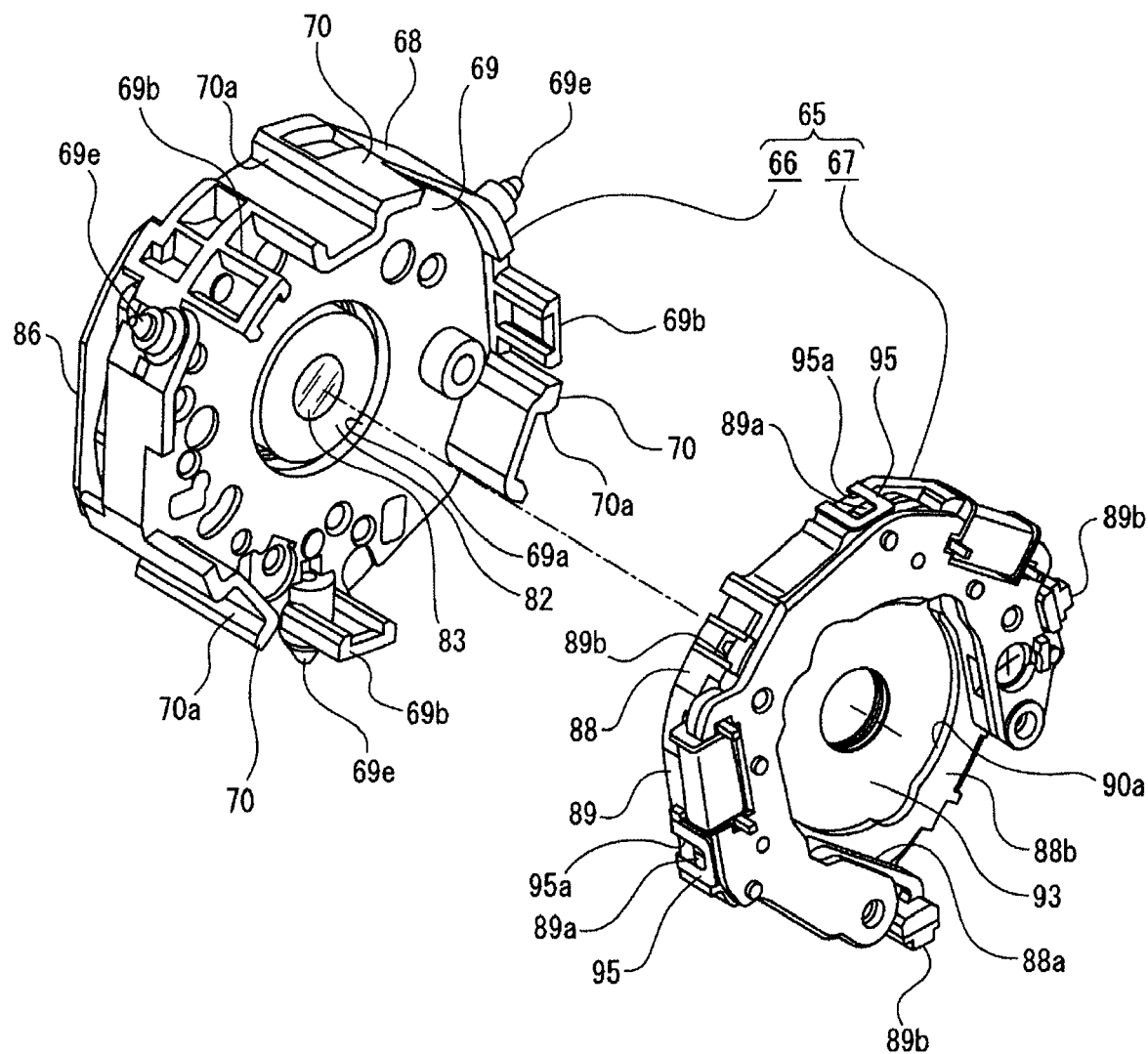
FIG. 20 is an enlarged perspective view of the intermediate movable unit separated from a light amount adjusting device.
Figure 21:
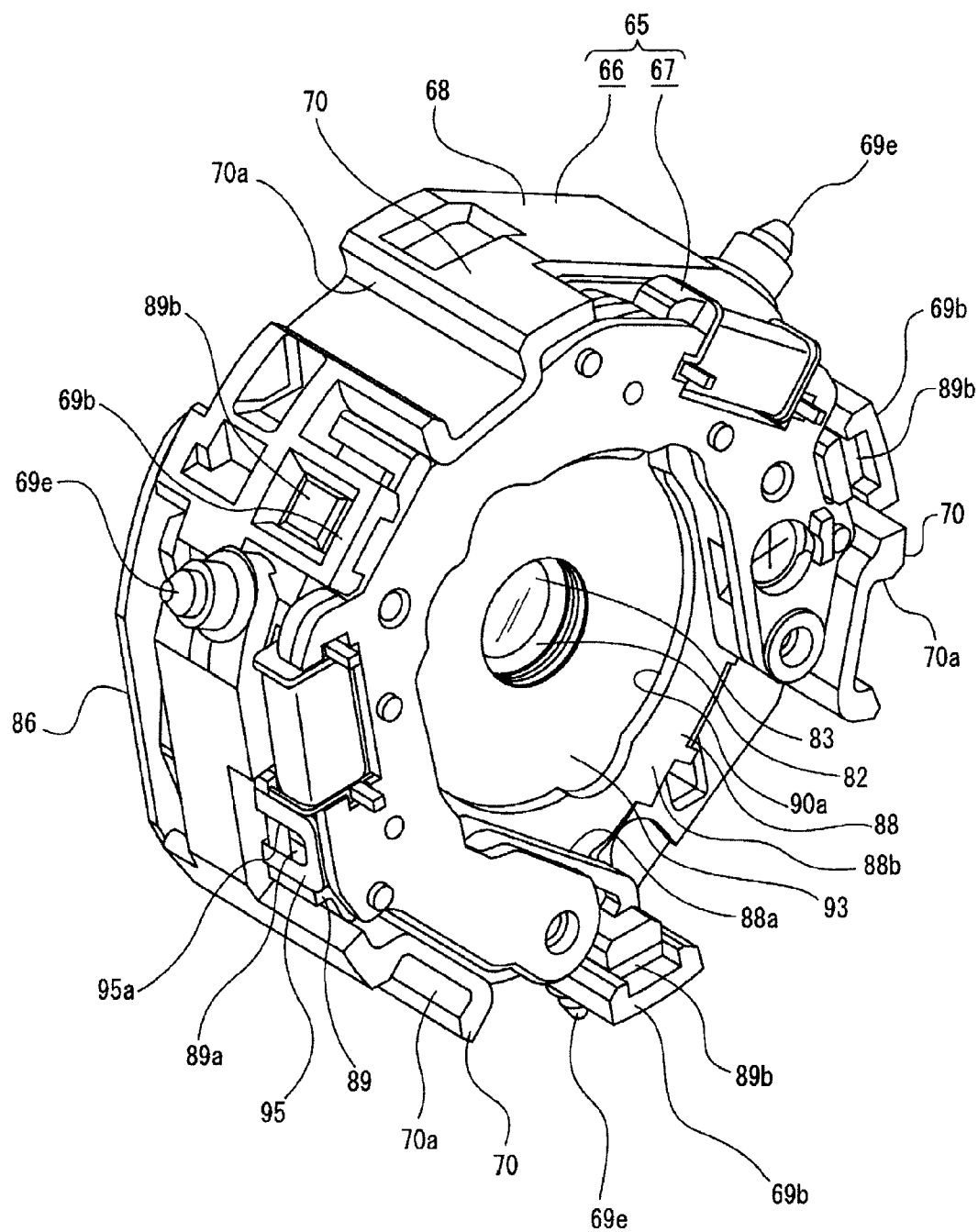
FIG. 21 is an enlarged perspective view of a second movable unit.

The light amount adjusting device 67 is mounted on a rear surface side of the intermediate movable unit 66, and both components form the second movable unit 65 (see FIGS. 20 and 21).

Figure 22:
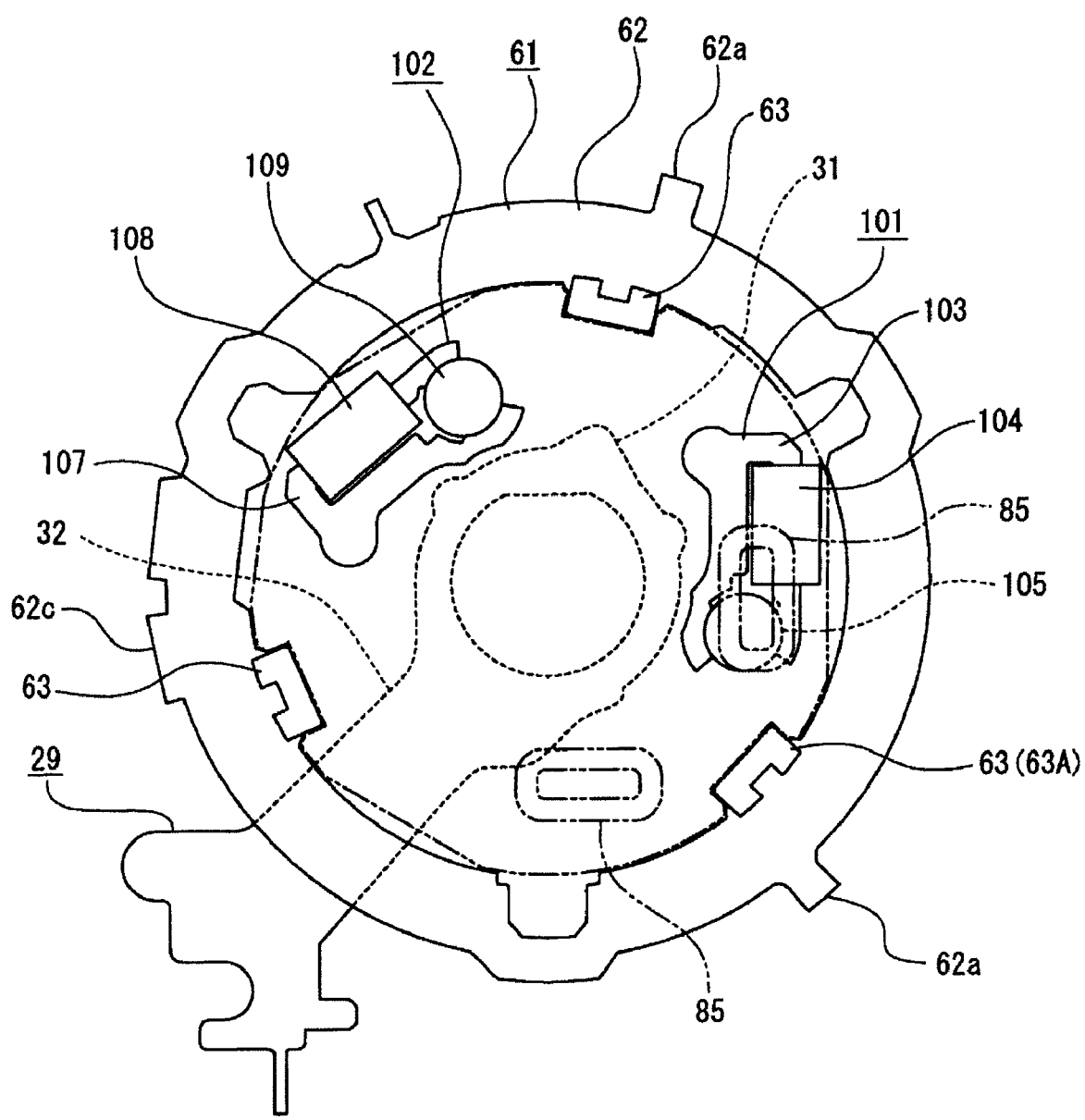
FIG. 22 is a schematic exploded front view showing a positional relationship between guide projections of the linear guide and other components.

As shown in FIGS. 6 and 22, in the second movable unit 65, the supported groove portions 70a, 70a, 70a formed in the supported cylindrical portions 70, 70, 70 of the base frame 68 are slidably supported by the guide projections 63, 63, 63 of the linear guide 61, and also the guided portions 69e, 69e, 69e are slidably supported by the guide portions 18d, 18d, 18d of the cam cylinder 18, respectively. Accordingly, the second movable unit 65 has its position changed with respect to the guided portions 69e, 69e, 69e by the rotation of the cam cylinder 18, and is moved in the front-rear direction (optical-axis direction) while guided by the linear guide 61.

It is noted that in the lens barrel 3, the linear guide 61 is not cylinder-shaped as a whole, but is formed of the annular portion 62 and the plurality of the guide projections 63, 63, 63 projecting from the annular portion 62, thereby facilitating the assembling of the second movable unit 65 into the linear guide 61.

With the second movable unit 65 supported by the linear guide 61 as mentioned above, one guide projection 63 of the linear guide 61, i.e., the guide projection 63 staying off to the lower left (a guide projection 63A shown in FIG. 22) is positioned between the driving coils 85, 85 so as to correspond to each other, as shown in FIG. 22. Accordingly, when the second movable unit 65 is moved in the optical-axis direction by the rotation of the cam cylinder 18 and when the linear guide 61 is moved in the optical-axis direction integrally with the cam cylinder 18, the driving coils 85, 85 do not interfere with the guide projection 63A, thereby easily avoiding the interference between the blur correction mechanism 87 and other mechanisms arranged inside the lens barrel 3, and also realizing the miniaturization of the lens barrel 3.

In addition, in the image capture apparatus 1, it is configured to use the guide projections 63, 63, 63 of the linear guide 61 as means for guiding the second movable unit 65 in the front-rear direction, and to move the linear guide 61 in the front-rear direction integrally with the cam cylinder 18. As a result, it is possible to reduce the length of the lens barrel 3 in the optical-axis direction by an amount of the movement of the linear guide 61 in the front-rear direction, compared with, e.g., a case where a guide shaft fixed inside the lens barrel 3 is used as means for guiding the second movable unit 65.

Furthermore, the three circumferentially spaced-apart guide projections 63, 63, 63 are provided on the linear guide 61, so that the linear guide 61 holds the second movable unit 65 with a large force, thereby stabilizing the movement of the second movable unit 65 in the optical-axis direction.

While an example is disclosed above in which the three circumferentially spaced-apart guide projections 63, 63, 63 are provided on the linear guide 61, the number of guide projections 63, 63, 63 is not limited to three, but may be any plural number.

Furthermore, the linear guide 61 is formed such that the annular portion 62 is formed integrally with the guide projections 63, 63, 63, thereby realizing reductions in the number of components and the manufacturing cost.

Moreover, as described above, in the image capture apparatus 1, the first guide shaft 73 and the second guide shaft 80 for guiding the first correcting moving frame 75 in the blur correction mechanism 87 are positioned in substantially the same plane orthogonal to the optical axis, thereby realizing a reduction in the length of the blur correction mechanism 87 in the optical-axis direction, as well as the miniaturization of the lens barrel 3.

In addition, in the blur correction mechanism 87, it is configured such that the first correcting moving frame 75 is slidably supported by the first guide shaft 73, and the second guide shaft 80 is fixed to the first correcting moving frame 75, so that neither the first guide shaft 73 nor the second guide shaft 80 are moved, but only the second guide shaft 80 is moved, during movement of the first correcting moving frame 75. Consequently, the longitudinal length of one of the shafts can be shortened by an amount of the movement.

The light amount adjusting device 67 of the second movable unit 65 is mounted on a rear surface side of the base frame 68 (see FIGS. 20 and 21).

The light amount adjusting device 67 is formed such that predetermined members are supported by or mounted on a base body 88 (see FIGS. 20, 21, 23, and 24).

Figure 25:
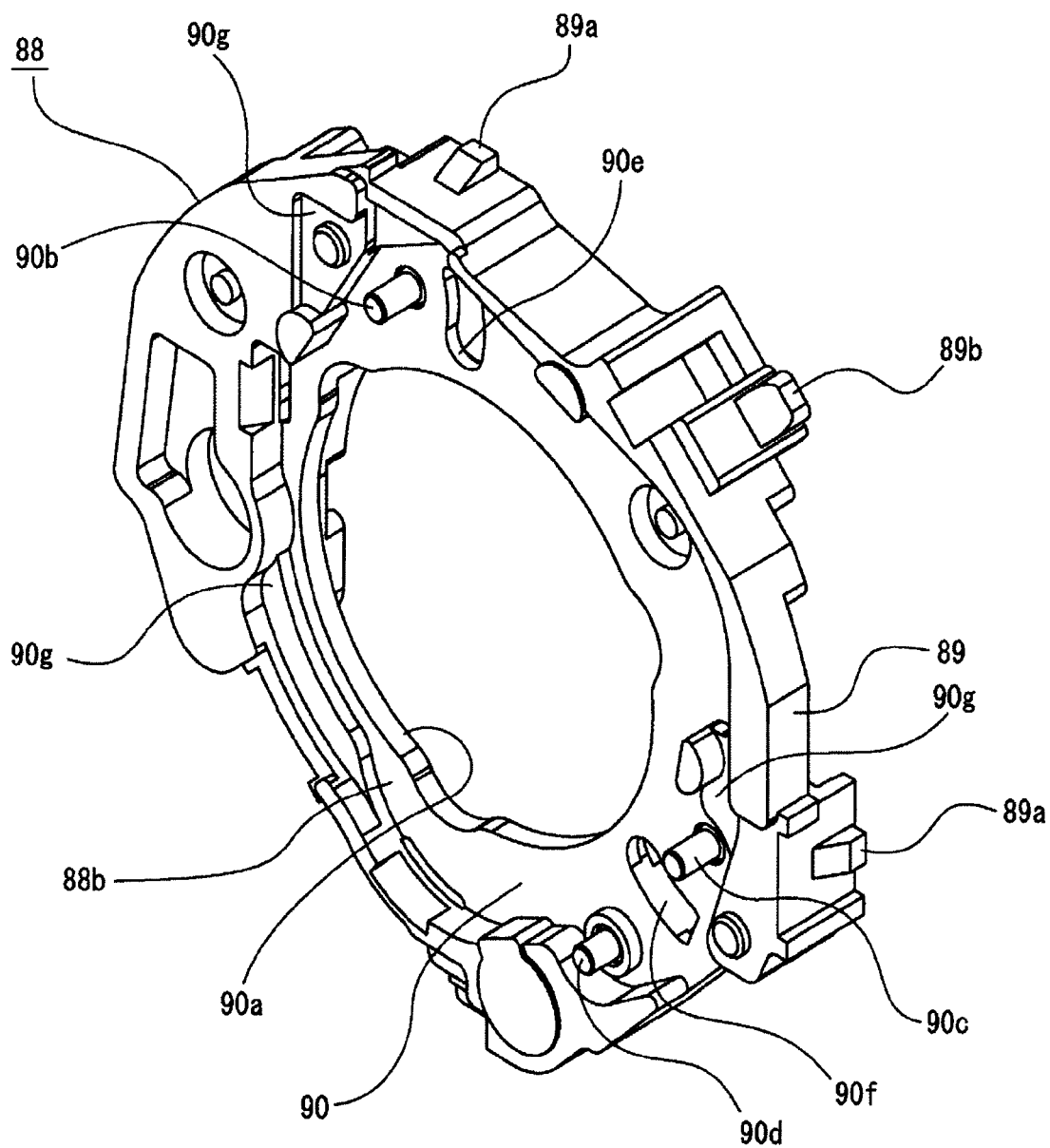
FIG. 25 is an enlarged perspective view of a base body.

The base body 88 is formed from a resin material into an approximately annular shape, and as shown in FIG. 25, has a frontward opened, shallow attachment recess 90 in a portion other than an outer circumferential portion 89 on a front surface side. The base body 88 is formed such that the portion on which the attachment recess 90 is formed is thinner than the outer circumferential portion 89.

A rearward opened, groove-shaped notch 88a is formed in part of a rear surface side of the base body 88 to provide a thin-walled portion 88b (see FIG. 20), and the thin-walled portion 88b is formed thinner than other portions.

Figure 23:
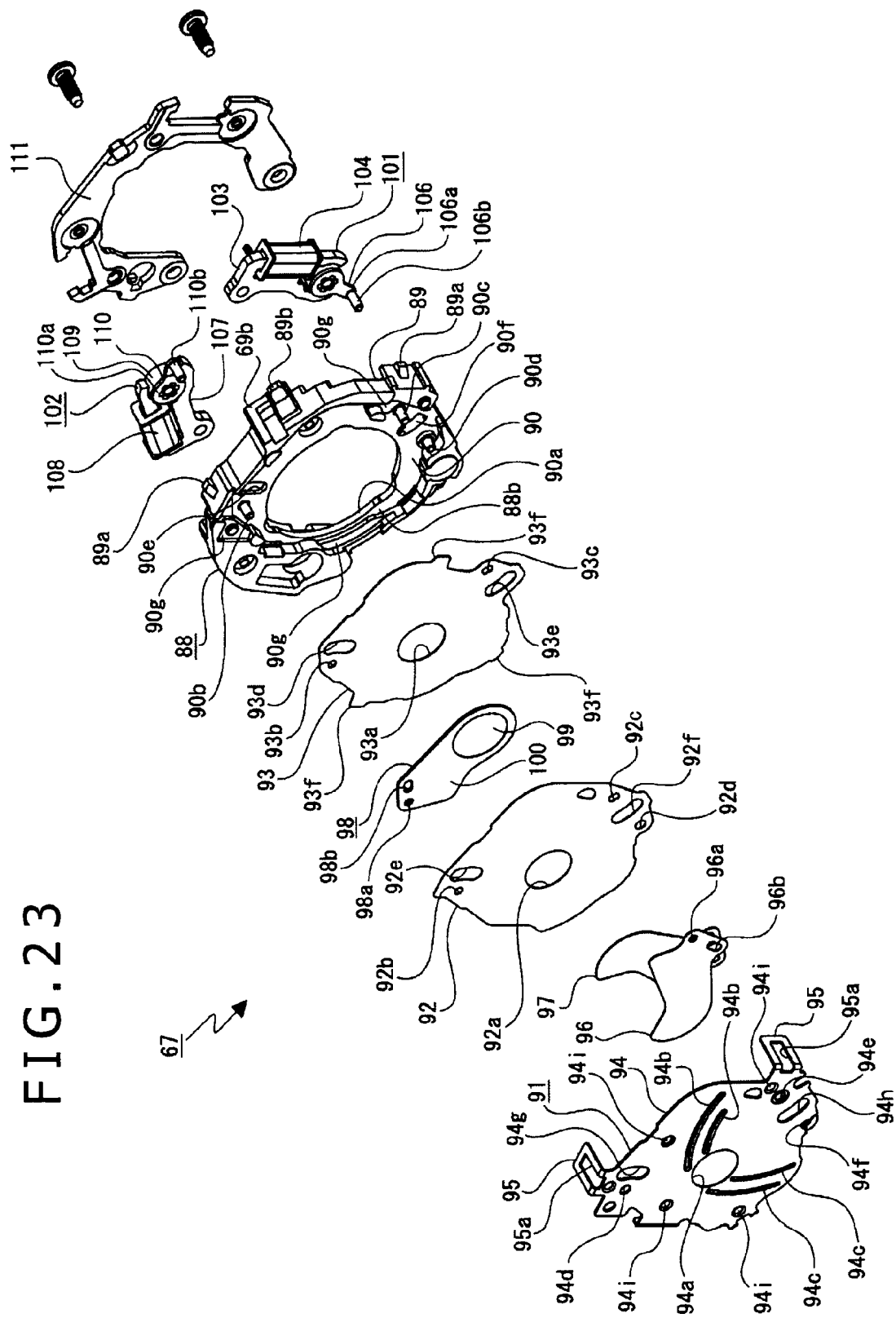
FIG. 23 is an exploded perspective view of the light amount adjusting device.
Figure 24:
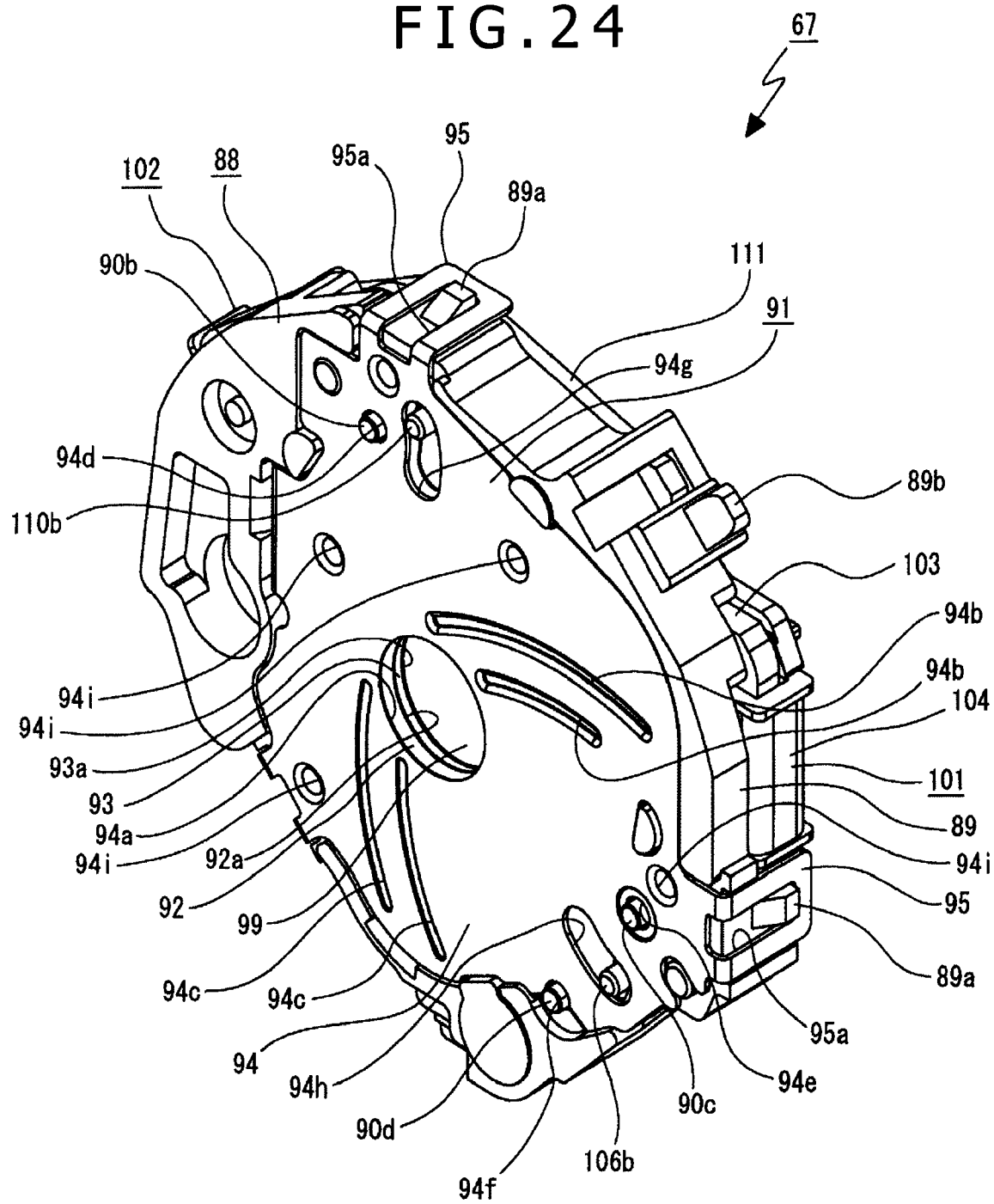
FIG. 24 is an enlarged perspective view of the light amount adjusting device.

Engageable catches 89a, 89a, 89a are provided on the outer circumferential portion 89 of the base body 88 so as to be spaced apart in the circumferential direction (see FIGS. 23 and 24). Mounting projections 89b, 89b, 89b are provided on an outer circumferential surface of the base body 88 so as to be spaced apart in the circumferential direction.

Figure 26:
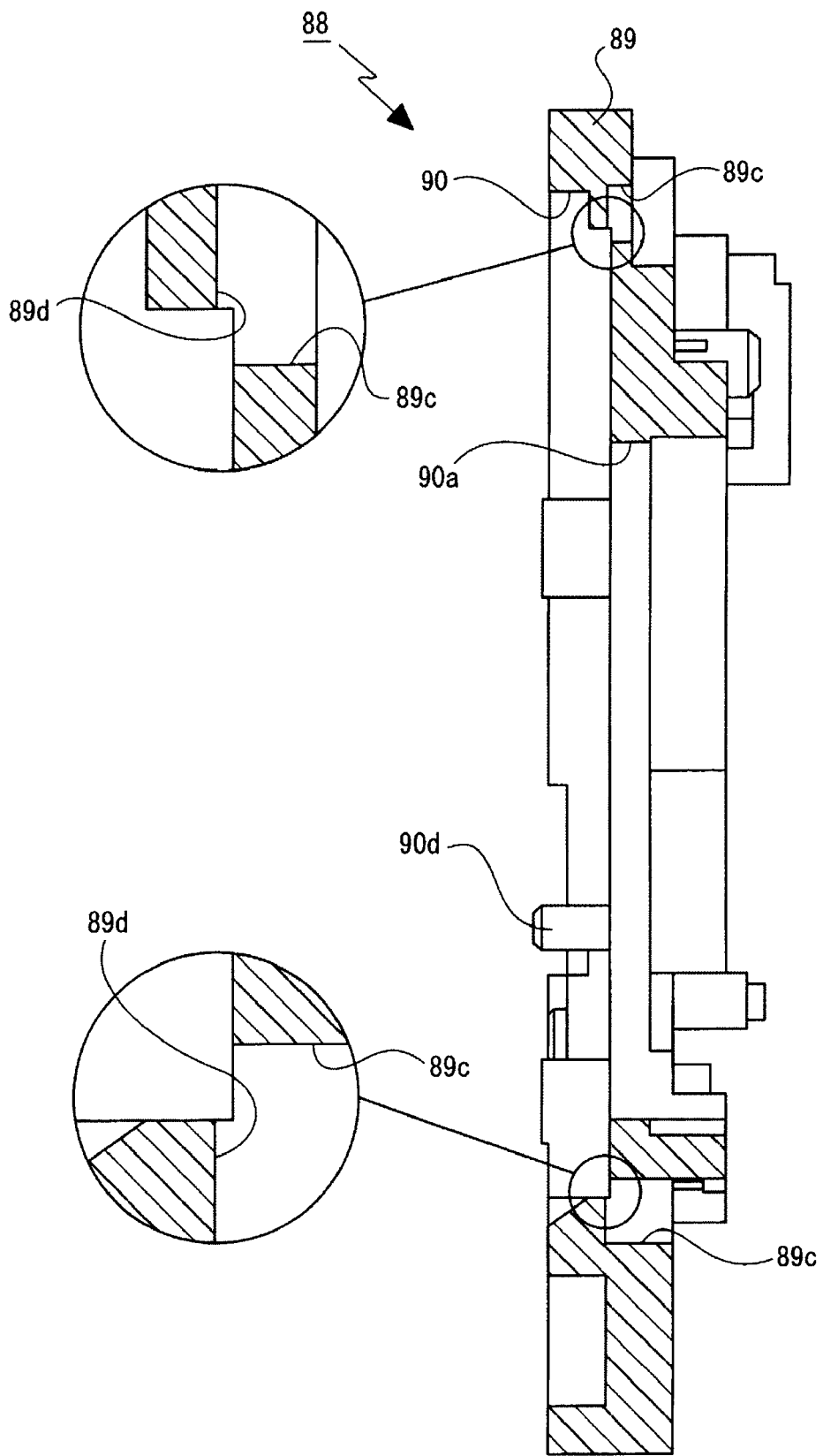
FIG. 26 is an enlarged perspective view of the base body.

Rearward opened molding holes 89c, 89c, 89c are formed in the outer circumferential portion 89 of the base body 88 (see FIG. 26), and the molding holes 89c, 89c, 89c are spaced apart in the circumferential direction. Front end portions of the molding holes 89c, 89c, 89c are formed as mounting grooves 89d, 89d, 89d communicating with the attachment recess 90, respectively.

Figure 27:
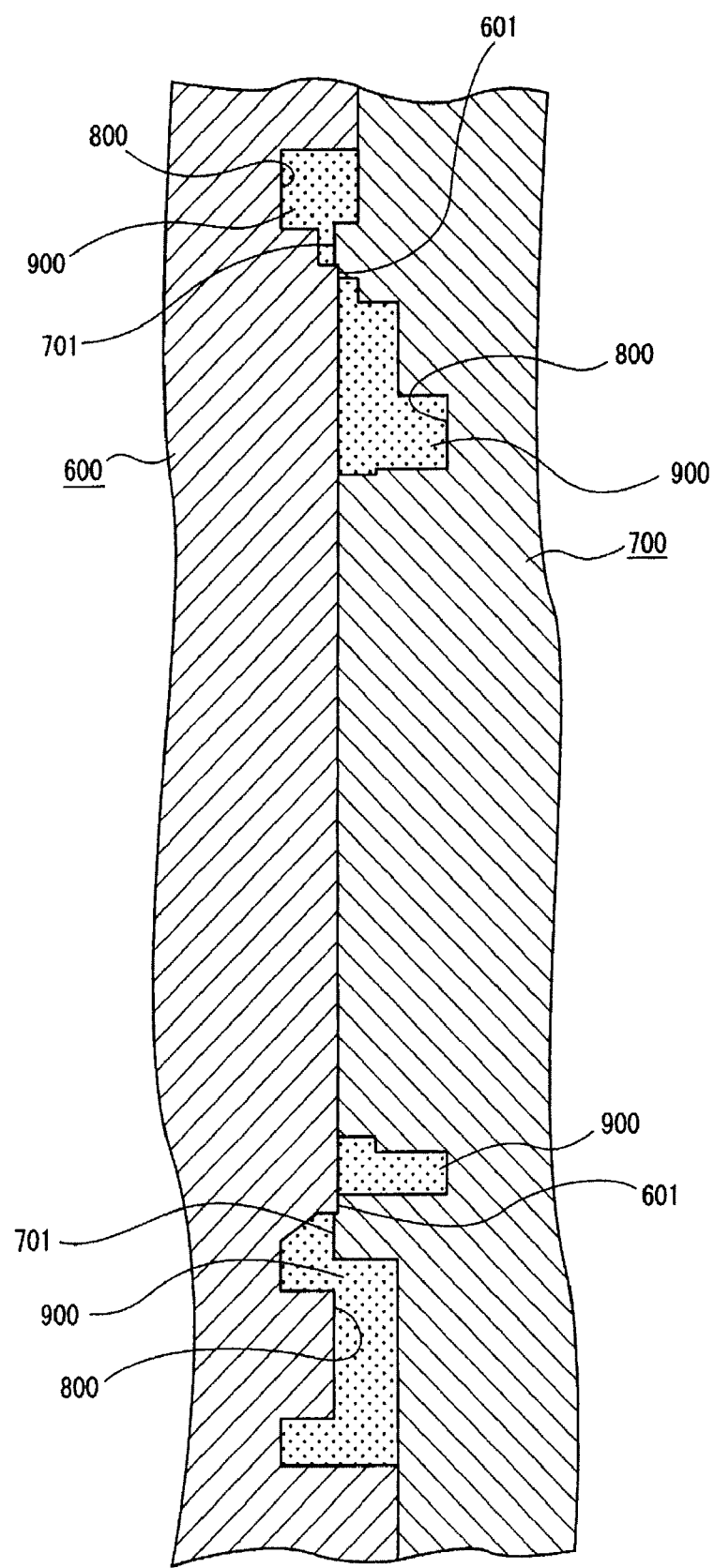
FIG. 27 is a diagram showing, along with FIG. 28, a procedure for molding the base body, FIG. 26 being an enlarged perspective view showing a state in which a first mold and a second mold are abutted to form cavities and resin melts are charged into the cavities.
Figure 28:
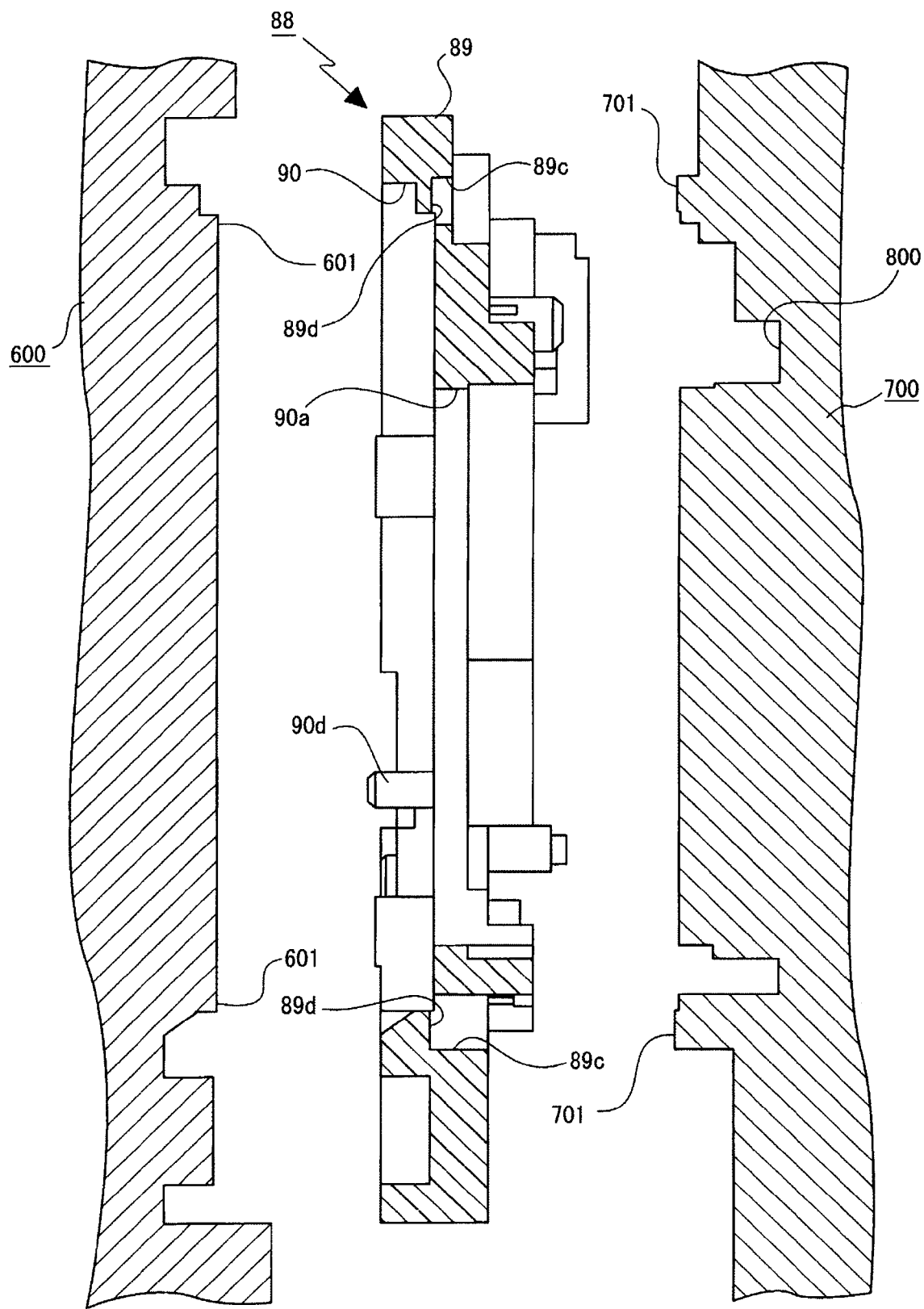
FIG. 28 is an enlarged sectional view showing a state in which the first mold and the second mold are separated from each other to form the base body.

The base body 88 is formed by injection molding, and the molding holes 89c, 89c, 89c including the mounting grooves 89d, 89d, 89d are formed by a first mold 600 and a second mold 700 which are separated from each other in the optical-axis direction (see FIGS. 27 and 28).

The first mold 600 is provided with rearward projecting mounting groove forming projections 601, 601, 601.

The second mold 700 is provided with frontward projecting mounting groove forming projections 701, 701, 701.

The first mold 600 and the second mold 700 are abutted with each other in the front-rear direction, to form cavities 800, 800, . . . (see FIG. 27). At this instance, the mounting groove forming projections 601, 601, 601 of the first mold 600 are brought into partial contact with the mounting groove forming projections 701, 701, 701 of the second mold 700.

Resin melts 900, 900, . . . are charged into the cavities 800, 800, . . . , and after the resin melts 900, 900, . . . harden, the first mold 600 is separated from the second mold 700, thereby forming the base body 88 (see FIG. 28). The molding holes 89c, 89c, 89c including the mounting grooves 89d, 89d, 89d are formed into the so-called "pinch-off" shape by the mounting groove forming projections 601, 601, 601 and the mounting groove forming projections 701, 701, 701 which are in contact with each other.

Since the molding holes 89c, 89c, 89c including the mounting grooves 89d, 89d, 89d can be formed easily into the pinch-off shape by the first mold 600 and the second mold 700 in this way, it is possible to facilitate the fabrication of the base body 88 and to reduce its manufacturing cost.

In addition, by forming the molding holes 89c, 89c, 89c including the mounting grooves 89d, 89d, 89d into the pinch-off shape, the mounting grooves 89d, 89d, 89d can be formed with high accuracy using a simple mold configuration.

The attachment recess 90 has a large throughhole 90a formed therein (see FIG. 25). The attachment recess 90 is provided with a frontward projecting filter rotating center shaft 90b, and frontward projecting shutter rotating center shafts 90c, 90d at positions around the throughhole 90a. The attachment recess 90 has arcuate throughholes 90e, 90f formed therein which pass through in the front-rear direction.

The filter rotating center shaft 90b and the shutter rotating center shafts 90c, 90d are positioned approximately opposite to each other with the throughhole 90a therebetween. The shutter rotating center shafts 90c, 90d are positioned so as to be spaced apart in the circumferential direction. The throughhole 90e is positioned near the filter rotating center shaft 90b, and the throughhole 90f is positioned between the shutter rotating center shafts 90c, 90d.

The base body 88 is provided with frontward projecting, arrangement step portions 90g, 90g, 90g along an outer circumferential portion of its attachment recess 90 so as to be spaced apart in the circumferential direction.

A cover plate 91, a first separator 92, and a second separator 93 are mounted on a front surface side of the base body 88 (see FIG. 24).

The cover plate 91 is formed from, e.g., a metallic material, and includes a cover portion 94 facing in the front-rear direction, and mounted projecting strips 95, 95, 95 projecting rearward from an outer circumferential portion of the cover portion 94.

Figure 29:
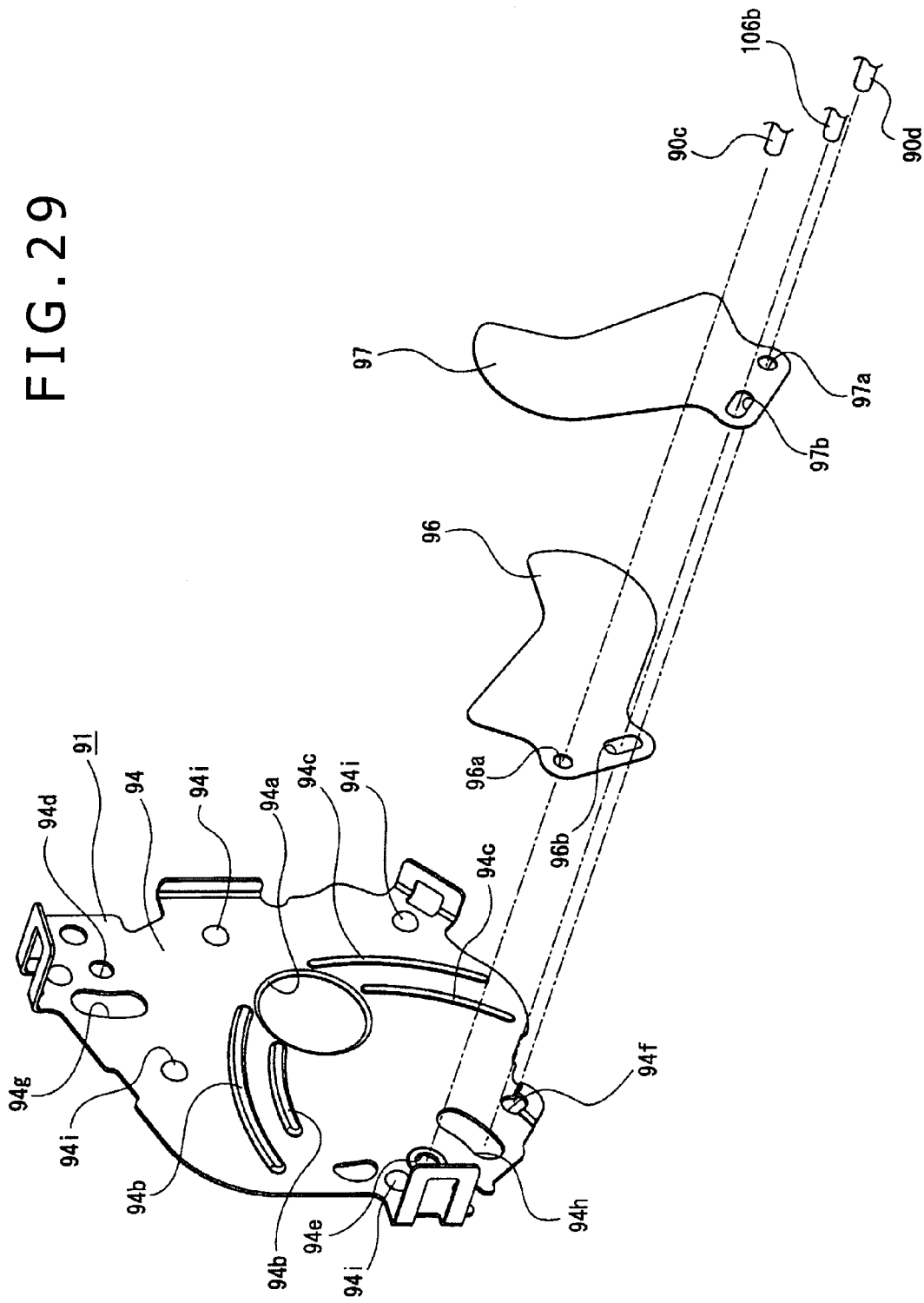
FIG. 29 is an enlarged exploded perspective view showing a cover plate and shutter blades.

At a midsection of the cover portion 94, a light-passing hole 94a is formed which is smaller than the throughhole 90a of the base body 88. The cover portion 94 is provided with first sliding projections 94b, 94b and second sliding projections 94c, 94c, all of which are embossed rearward (see FIGS. 23 and 29).

The first sliding projections 94b, 94b and the second sliding projections 94c, 94c are positioned approximately opposite to each other with the light-passing hole 94a therebetween, and are arc-shaped. The first sliding projecting 94b, 94b and the second sliding projections 94c, 94c have different amounts of projection, i.e., embossment, and the first sliding projections 94b, 94b are higher than the second sliding projections 94c, 94c.

Along the outer circumferential portion of the cover portion 94, shaft insertion holes 94d, 94e, 94f and arcuate insertion holes 94g, 94h are formed. The shaft insertion hole 94d and the shaft insertion holes 94e, 94f are positioned approximately opposite with the light-passing hole 94a therebetween, whereas the shaft insertion holes 94e, 94f are spaced apart in the circumferential direction. The insertion hole 94g is positioned near the shaft insertion hole 94d, whereas the insertion hole 94h is positioned between the shaft insertion holes 94e, 94f.

The first sliding projections 94b, 94b are formed into arcs on circles having the shaft insertion hole 94f as their center, whereas the second sliding projections 94c, 94c are formed into arcs on circles having the shaft insertion hole 94e as their center.

At predetermined positions of the cover portion 94, protrusions 94i, 94i, . . . are provided so as to be embossed rearward.

Engageable holes 95a, 95a, 95a are formed in the mounted projecting strips 95, 95, 95, respectively.

The first separator 92 is sheet-shaped while made from, e.g., a resin material such as polyethylene terephthalate, or a metallic material, and has, at a midsection thereof, a hole 92a which has approximately the same size as the light-passing hole 94a of the cover plate 91. Along an outer circumferential portion of the first separator 92, shaft insertion holes 92b, 92c, 92d and arcuate insertion holes 92e, 92f are formed. The shaft insertion hole 92b and the shaft insertion holes 92c, 92d are positioned approximately opposite to each other with the hole 92a therebetween, and the shaft insertion hole 92c, 92d are spaced apart in the circumferential direction. The insertion hole 92e is positioned near the shaft insertion hole 92b, and the insertion hole 92f is positioned between the shaft insertion holes 92c, 92d.

The second separator 93 is sheet-shaped while made from, e.g., a resin material such as polyethylene terephthalate, or a metallic material, and has, at a midsection thereof, a hole 93a which has approximately the same size as the light-passing hole 94a of the cover plate 91. Along an outer circumferential portion of the second separator 93, shaft insertion holes 93b, 93c and arcuate insertion holes 93d, 93e are formed. The shaft insertion hole 93b and the shaft insertion hole 93c are positioned approximately opposite to each other with the hole 93a therebetween. The insertion holes 93d, 93e are positioned near the shaft insertion holes 93b, 93c, respectively.

Along the outer circumferential portion of the second separator 93, outward projecting mounting projections 93f, 93f, 93f are provided so as to be spaced apart in the circumferential direction.

The base body 88 rotatably supports shutter blades 96, 97 used as first light amount adjusting blades and a light amount adjusting blade 98 provided as a second light amount adjusting blade.

The shutter blades 96, 97 are formed from a sheet-shaped material, and have shaft insertion holes 96a, 97a, and operation holes 96b, 97b which are elongated in one direction, respectively. These shaft insertion hole and operation hole are formed at one end portion of each of the shutter blades 96, 97.

Figure 30:
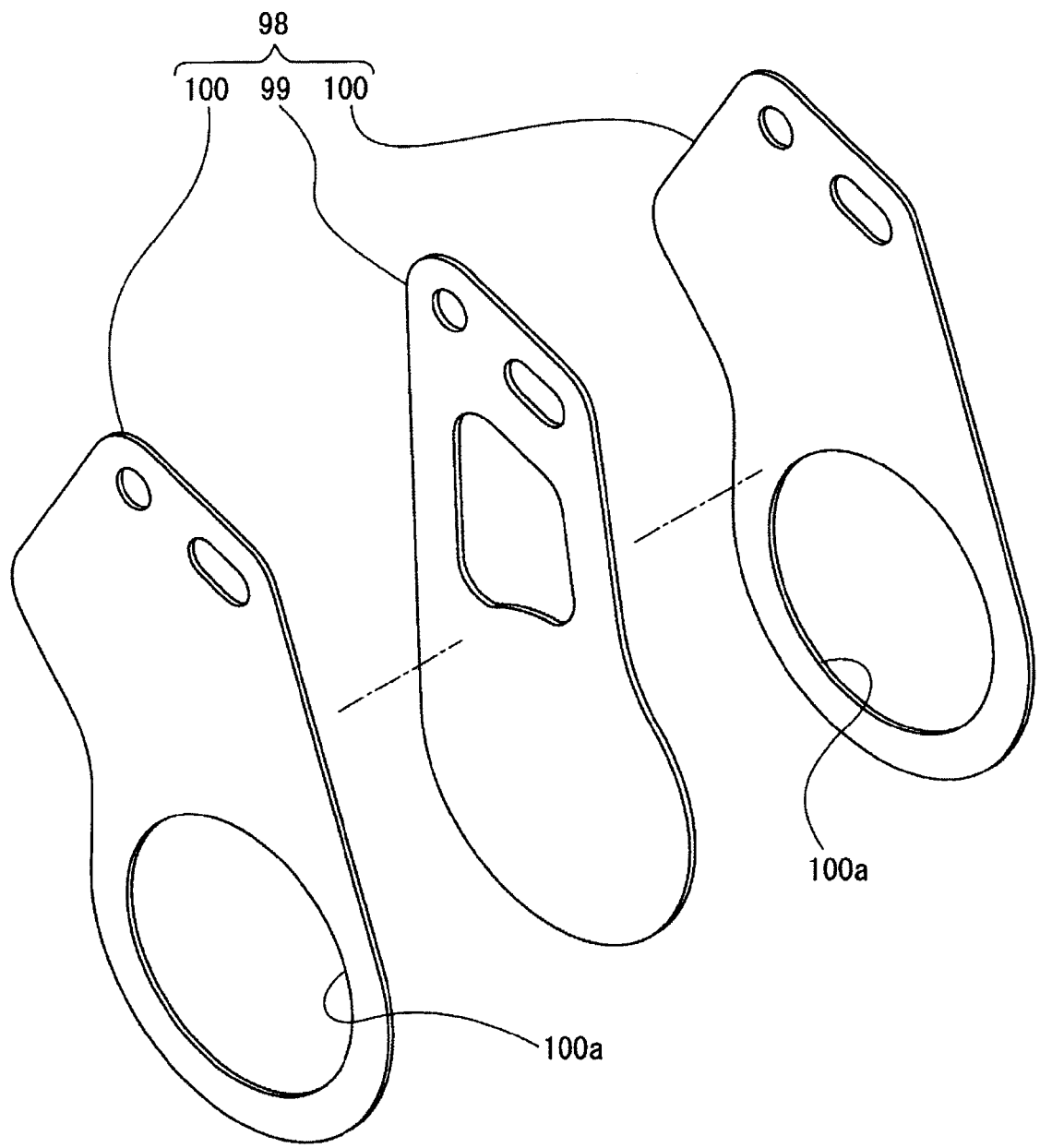
FIG. 30 is an enlarged perspective view of a light amount adjusting blade.

As shown in FIG. 30, the light amount adjusting blade 98 is formed such that sheet members 100, 100 are, e.g., stuck onto both surfaces of a light reducing filter 99. The sheet members 100, 100 have circular holes 100a, 100a formed therein, each having a diameter larger than the hole 92a of the first separator 92. Accordingly, in the light amount adjusting blade 98, the light reducing filter 99 is exposed to positions corresponding to the circular holes 100a, 100a. AND (Neutral Density) filter may be used as the light reducing filter 99.

In the light amount adjusting blade 98, a shaft insertion hole 98a, and an operation hole 98b which is elongated in one direction, are formed at one end portion thereof (see FIG. 23).

Figure 31:
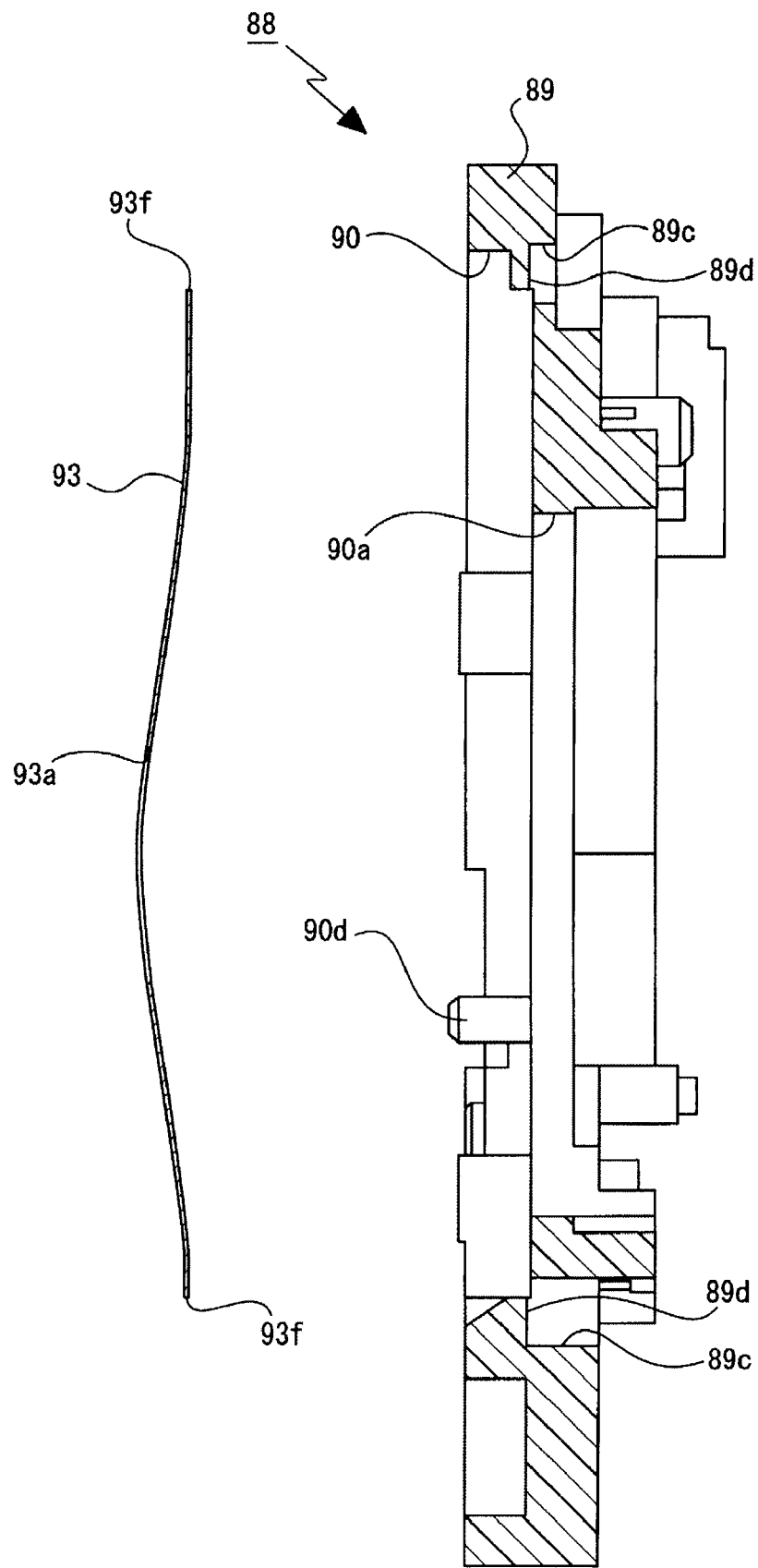
FIG. 31 is an enlarged sectional view showing a state before a second separator is mounted on the base body.
Figure 32:
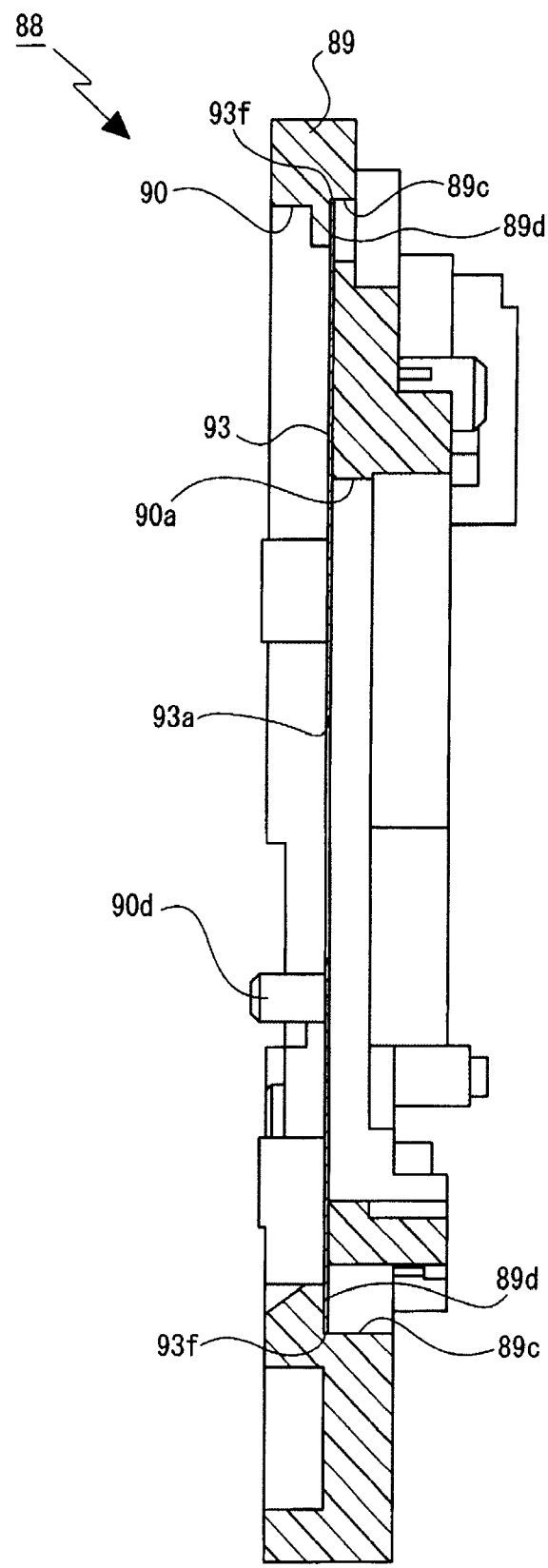
FIG. 32 is an enlarged sectional view showing a state in which the second separator is mounted on the base body.
Figure 33:
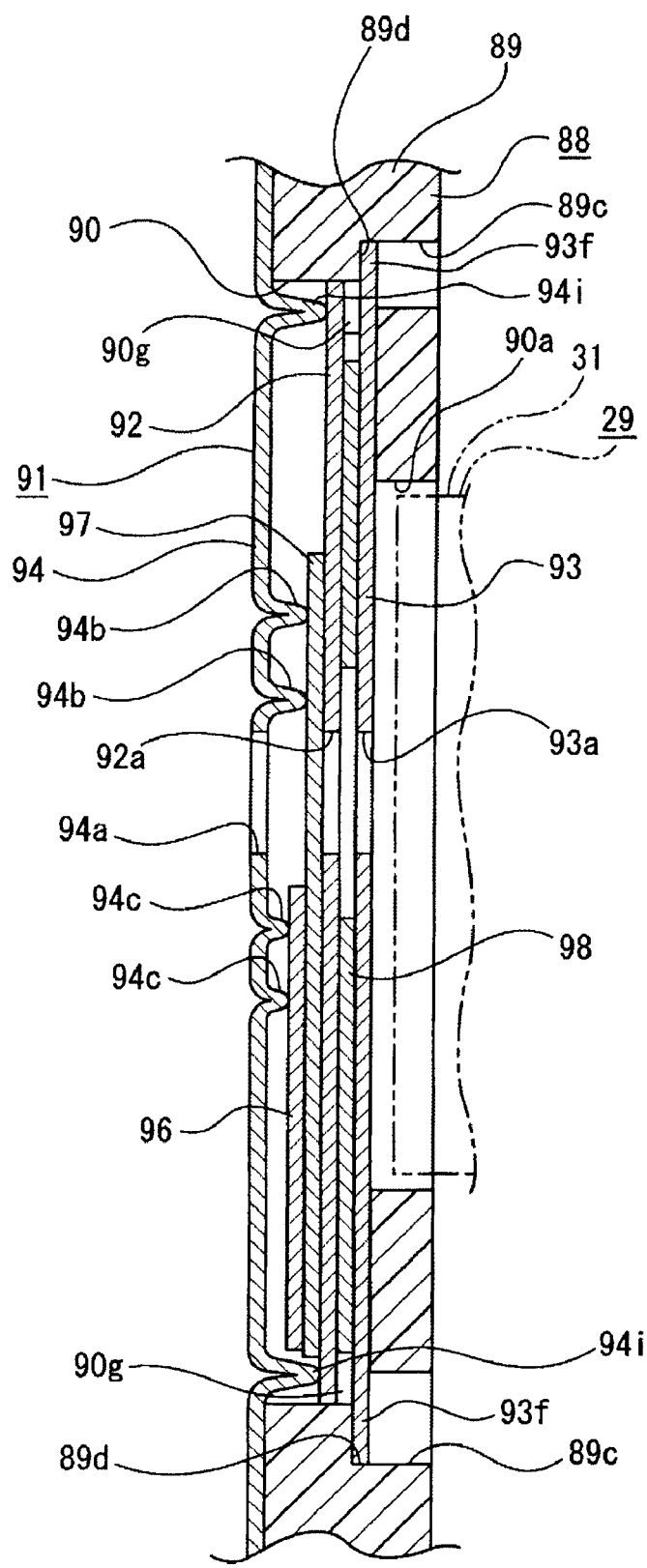
FIG. 33 is a schematic enlarged sectional view of the light amount adjusting blade.

The second separator 93 is mounted while arranged on the attachment recess 90 of the base body 88, by the second separator 93 being elastically deformed such that the whole body thereof is bent (see FIG. 31) and elastically returned, to insert the mounting projections 93f, 93f, 93f into the mounting grooves 89*d*, 89*d*, 89*d* (see FIG. 32). The second separator 93, as mounted on the base body 88, comes in surface contact with a front surface of the attachment recess 90 (see FIG. 33). At this instance, the filter rotating center shaft 90*b* and the shutter rotating center shaft 90*c* of the base body 88 are inserted into the shaft insertion holes 93*b*, 93*c* of the second separator 93, respectively. The shutter rotating center shaft 90*c* is positioned immediately outside the second separator 93.

The light a mount adjusting blade 98 is rotatably supported on a front surface side of the second separator 93 by the base body 88, by the filter rotating center shaft 90*b* of the base body 88 being inserted into the shaft insertion hole 98*a*, and using the filter rotating center shaft 90*b* as a fulcrum.

With the light amount adjusting blade 98 supported by the base body 88, the first separator 92 is mounted while arranged on the arrangement step portions 90*g*, 90*g*, 90*g* of the base body 88. Accordingly, the light amount adjusting blade 98 is rotatable while sliding between the first separator 92 and the second separator 93.

The light amount adjusting blade 98 has a three-sheet configuration with the sheet members 100, 100 stuck onto both surfaces of the light reducing filter 99 as mentioned above, thereby preventing the light reducing filter 99 from being damaged or broken during rotation between the first separator 92 and the second separator 93.

While an example is disclosed above in which a ND filter is used as the light amount adjusting blade 98, the light amount adjusting blade 98 may not necessarily be a ND filter, but may be an iris blade whose aperture diameter is smaller than that of the hole 92*a* of the first separator 92, or may be a combination of an iris blade and a ND filter.

With the first separator 92 mounted on the base body 88, the shutter blades 96, 97 are rotatably supported by the base body 88. The shutter blades 96, 97 are rotatably supported by the base body 88 with the one partially overlapping the other, by the shutter rotating center shafts 90*c*, 90*d* of the base body 88 being inserted into the shaft insertion holes 96*a*, 98*a*, and using the shutter rotating center shafts 90*c*, 90*d* as fulcrums, respectively.

With the shutter blades 96, 97 supported by the base body 88, the cover plate 91 is mounted onto the base body 88. The cover plate 91 is mounted onto the base body 88 by the engageable catches 89*a*, 89*a*, 89*a* being engaged with the engageable holes 95*a*, 95*a*, 95*a* of the mounted projecting strips 95, 95, 95. Accordingly, the shutter blades 95, 97 are rotatable between the cover plate 91 and the first separator 92.

At this instance, the projections 94*i*, 94*i*, ... of the cover plate 91 come in contact with a front surface of the first separator 92, thereby ensuring moving spaces of the shutter blades 96, 97 between the cover plate 91 and the first separator 92. It is noted that the projections 94*i*, 94*i*, ... are provided at positions off moving loci of the shutter blades 96, 97.

In addition, as mentioned above, the first sliding projections 94*b*, 94*b* and the second sliding projections 94*c*, 94*c* of the cover plate 91 are formed to have different heights, and the shutter blade 97 is slid along the first sliding projections 94*b*, 94*b*, and the shutter blade 96 is slid along the second sliding projections 94*c*, 94*c*.

In this way, in the light amount adjusting device 67, the first sliding projections 94*b*, 94*b* and the second sliding projections 94*c*, 94*c* of the cover plate 91 are formed to have different heights, so that the shutter blade 96 and the shutter blade 97 can be held at positions different in a thickness direction. Consequently, the shutter blades 96, 97 are hard to interfere with each other during rotations, thereby realizing their smooth operations.

Furthermore, as mentioned above, the first sliding projections 94*b*, 94*b* are formed into arcs on circles having the shaft insertion hole 94*f* as their center, and the second sliding projections 94*c*, 94*c* are formed into arcs on circles having the shaft insertion hole 94*e* as their center, so that the frictional resistances of the shutter blades 96, 97 to the second sliding projections 94*c*, 94*c* and the first sliding projections 94*b*, 94*b* during rotations are hard to change, thereby realizing the smooth operations of the shutter blades 96, 97.

It is noted that in the light amount adjusting device 67, it is configured to arrange the light amount adjusting blade 98 between the first separator 92 and the second separator 93, and to arrange the shutter blades 96, 97 between the first separator 92 and the cover plate 91 having the first sliding projections 94*b*, 94*b* and the second sliding projections 94*c*, 94*c*.

In this way, by arranging the shutter blades 96, 97 on a side where frictional resistances are small, the operations of the shutter blades 96, 97 requiring accurate rotations are made smooth, thereby improving the reliability of operations performed in the lens barrel 3.

A first actuator 101 and a second actuator 102 are mounted onto a rear surface of the base body 88 (see FIG. 23).

The first actuator 101 has a yoke member 103, and a coil 104, and a driving arm 106 which are held by the yoke member 103. The driving arm 106 includes a base portion 106*a* and an arm portion 106*b* projecting frontward from the base portion 106*a*. A magnetized magnet 105 is held by the base portion 106*a* of the driving arm 106 so as to be integral therewith.

The second actuator 102 has a yoke member 107, and a coil 108 and a driving arm 110 which are held by the yoke member 107. The driving arm 110 includes a base portion 110, and an arm portion 110*b* projecting frontward from the base portion 110. A magnetized magnet 109 is held by the base portion 110 of the driving arm 110 so as to be integral therewith.

The first actuator 101 and the second actuator 102 are operated such that thrusts occur between the coils 104, 108 and the magnets 105, 109 responsive to currents flowing through the coils 104, 108, and these thrusts rotate the driving arms 106, 110 responsive to the directions of the currents flowing through the coils 104, 108, respectively.

The first actuator 101 and the second actuator 102 are mounted onto the base body 88 at positions of the base body 88 which are spaced part in the circumferential direction, while pressed by a pressing plate 111 from the rear. The pressing plate 111 is approximately U-shaped, and is fixed to the base body 88 by, e.g., screwing. The pressing plate 111 is fixed to a portion other than the thin-walled portion 88*b* of the base body 88 (see FIGS. 20 and 21).

With the first actuator 101 and the second actuator 102 mounted on the base body 88, the arm portion 106 of the driving arm 106 is inserted into holes, in order of the insertion hole 90*f* of the base body 88, the insertion hole 93*e* of the second separator 93, the insertion hole 92*f* of the first separator 92, the operation holes 96*b*, 97*b* of the shutter blades 96, 97, and the insertion hole 94*h* of the cover plate 91, whereas the arm portion 110*b* of the driving arm 110 is inserted into holes, in order of the insertion hole 90*e* of the base body 88, the insertion hole 93*d* of the second separator 93, the operation hole 98*b* of the light amount adjusting blade 98, the insertion hole 92*e* of the first separator 92, and the insertion hole 94*g* of the cover plate 91.

When the driving arm 106 is rotated by the driving of the first actuator 101, opening edges of the operation holes 96*b*, 97*b* are pressed by the arm portion 106*b*, and the shutter blades 96, 97 are rotated in directions responsive to the direction of the current flowing through the coil 104. When the driving arm 110 is rotated by the driving of the second actuator 102, an opening edge of the operation hole 98b is pressed by the arm portion 110b, and the light amount adjusting blade 98 is rotated in a direction responsive to the direction of the current flowing through the coil 108.

A wiring board 112 is mounted onto a rear surface of the pressing plate 111 (see FIG. 4). The wiring board 112 is connected to the coils 104, 108, and has a function of supplying power to the coils 104, 108.

The thus configured light amount adjusting device 67 is mounted onto the intermediate movable unit 66 by the mounting projections 89b, 89b, 89b provided along the outer circumferential surface of the base body 88 being engaged with the mounting frame portions 69b, 69b, 69b of the base frame 68, and the second movable unit 65 is formed of the intermediate movable unit 66 and the light amount adjusting device 67.

As described above, in the light amount adjusting device 67, the light amount adjusting blade 98 is sandwiched between the second separator 93 and the first separator 92 which are mounted on the base body 88. Accordingly, the throughhole 90a of the base body 88 is made larger than the hole 93a of the second separator 93, and a member arranged on a rear side of the base body 88, i.e., the holding arm 29 of the focus moving unit 28 can be moved as far as to a position where the arm 29 is inserted into the throughhole 90a, by the enlarged size of the throughhole 90a (see FIG. 33). Consequently, it is possible to realize a thickness reduction of the lens barrel 3 in the optical-axis direction.

In addition, the second separator 93 is mounted onto the base body 88 by the second separator 93 being elastically deformed to insert the mounting projections 93f, 93f, 93f into the mounting grooves 89d, 89d, 89d formed into the so-called pinch-off shape, thereby facilitating the mounting of the second separator 93 onto the base body 88, and also the formation of the mounting grooves 89d, 89d, 89d.

Furthermore, in the light amount adjusting device 67, the plurality of the mounting projections 93f, 93f, 93f, which are mounted while inserted into the mounting grooves 89d, 89d, 89d of the base body 88, are provided along the outer circumferential portion of the second separator 93 so as to be spaced apart in the circumferential direction, thereby stabilizing the mounting condition of the second separator 93 on the base body 88.

In addition, in the light amount adjusting device 67, the cover plate 91 is made from a metallic material, and the second sliding projections 94c, 94c and the first sliding projections 94b, 94b along which the shutter blades 96, 97 are slid are provided, so that frictional forces occurring during operations of the shutter blades 96, 97 are small, thereby improving the reliability of the operations and also reducing power consumption.

Figure 34:
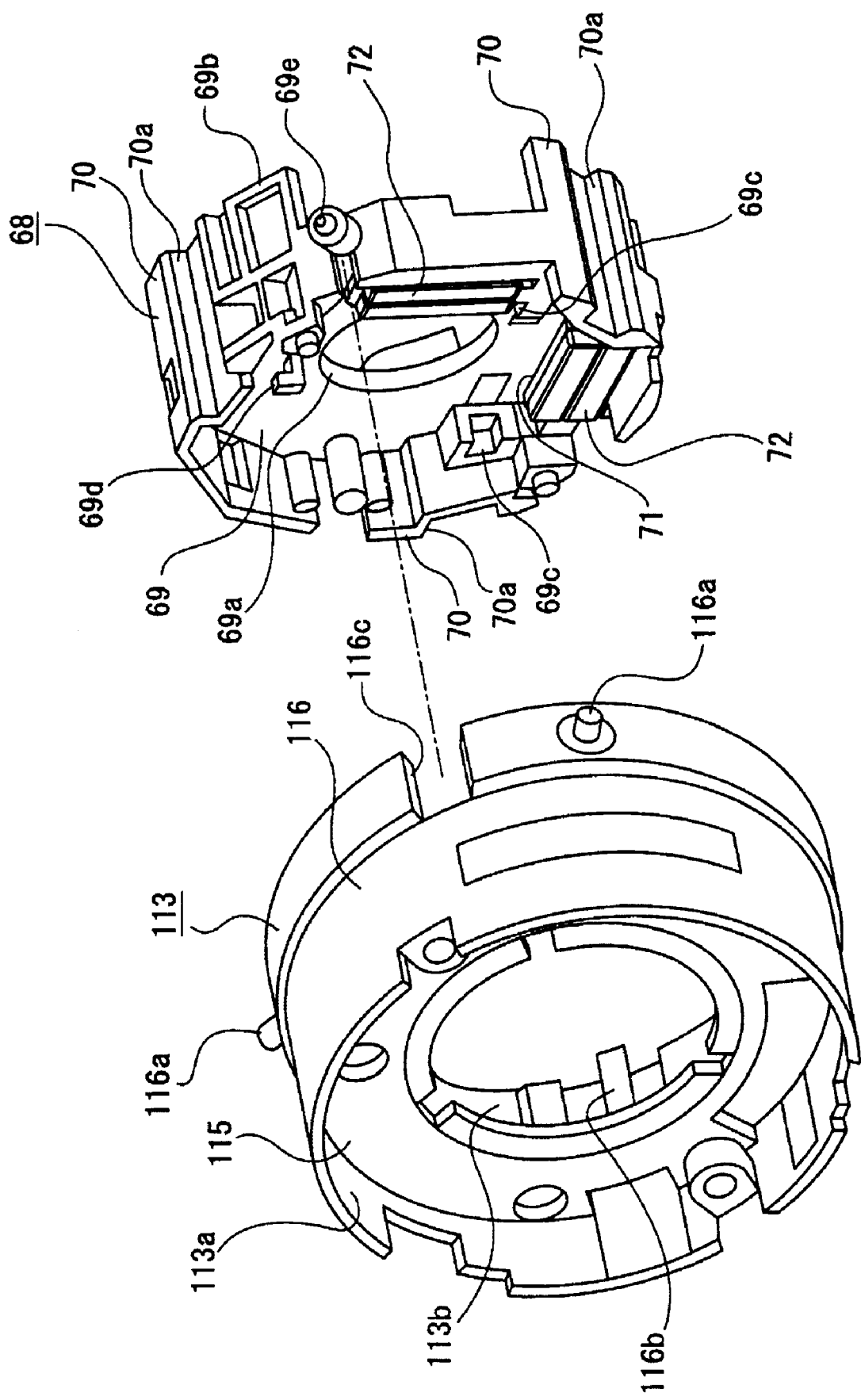
FIG. 34 is an enlarged exploded perspective view showing a movable frame and a base frame.
Figure 35:
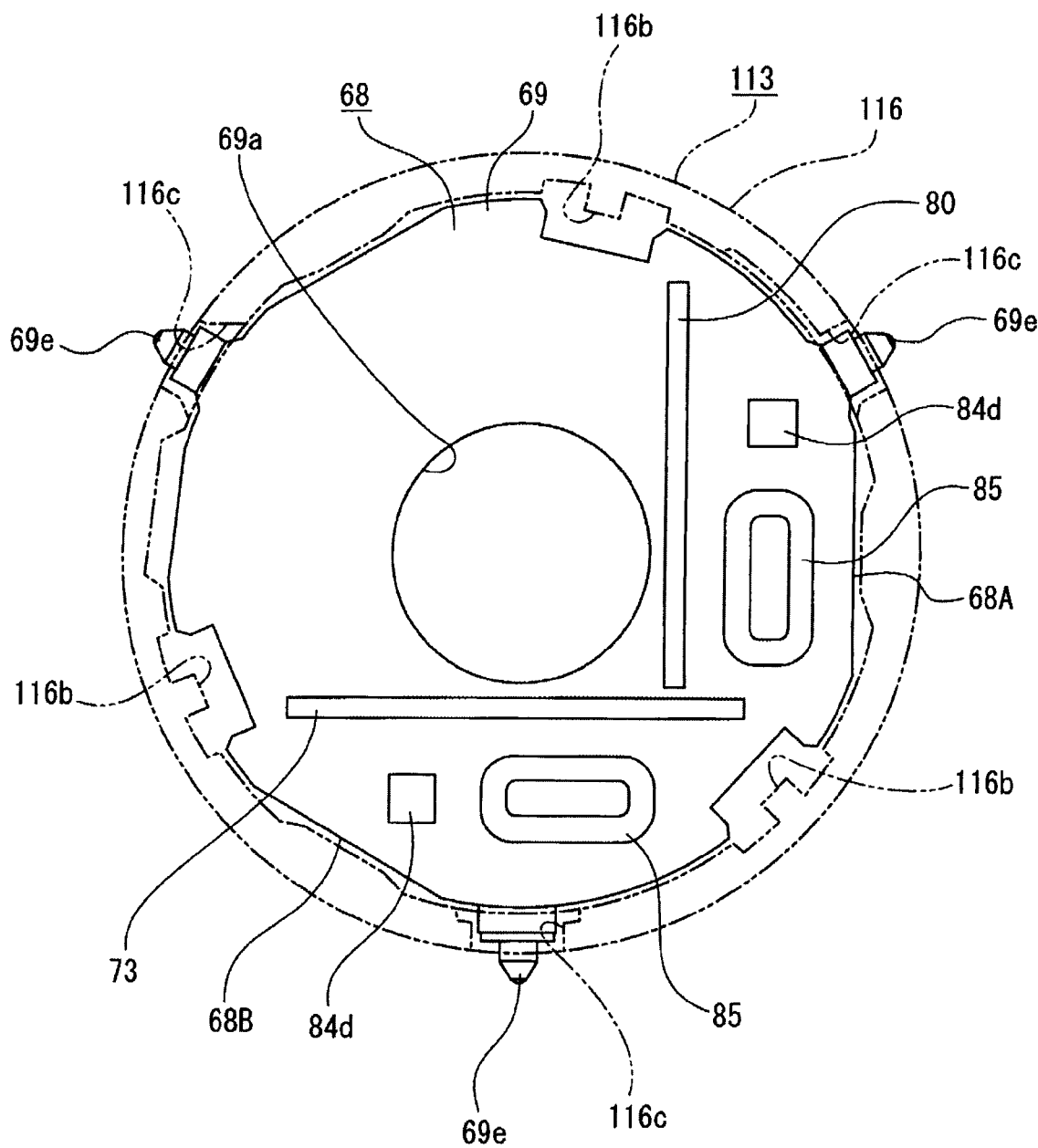
FIG. 35 is a schematic enlarged front view showing a positional relationship among the movable frame, the base frame, and other components.

The first movable unit 19 is formed such that a lens group 114 is held in a moving frame 113 (see FIGS. 4 and 6). As shown in FIGS. 34 and 35, the moving frame 113 includes a frontward/rearward facing, plate-shaped annular portion 115, and a circumferential surface portion 116 provided along an outer circumferential edge of the annular portion 115. The circumferential surface portion 116 projects both frontward and rearward from the annular portion 115.

In the moving frame 113, a frontward opened front-side recess 113a and a rearward opened rear-side recess 113b are formed by the circumferential surface portion 116 being projected frontward and rearward from the annular portion 115.

At a midsection of the annular portion 115, the lens group 114 is mounted via a lens holder 117.

On an outer circumferential surface of the circumferential surface portion 116, outward projecting guided portions 116a, 116a, 116a are provided so as to be spaced apart in the circumferential direction. On a side further rearward than the annular portion 115 in an inner circumferential surface of the circumferential surface portion 116, inward projecting supported projecting ridges 116b, 116b, 116b are provided so as to be spaced apart in the circumferential direction. The supported projecting ridges 116b, 116b, 116b are formed so as to extend in the front-rear direction.

On a rear end portion of the circumferential surface portion 116, outward opened insertion notches 116c, 116c, 116c are formed so as to be spaced apart in the circumferential direction.

In the first movable unit 19, the supported projecting ridges 116b, 116b, 116b provided on the inner circumferential surface of the circumferential surface portion 116 of the moving frame 113 are slidably supported by the sliding grooves 63a, 63a, 63a of the guide projections 63, 63, 63 of the linear guide 61, respectively, and also the guided portions 116a, 116a, 116a provided on the outer circumferential surface of the circumferential surface portion 116 are slidably supported by the guiding portions 18e, 18e, 18e of the cam cylinder 18, respectively. Accordingly, the first movable unit 19 is moved in the front-rear direction (optical-axis direction) while guided by the linear guide 61, by having the positions of the guided portions 116a, 116a, 116a with respect to the guiding portions 18e, 18e, 18e changed by the rotation of the cam cylinder 18.

A lens barrier 118 is mounted on a front surface side of the first movable unit 19 (see FIGS. 4 and 6). The lens barrier 118 is formed such that a pair of opening/closing members 119, 119 is supported by a circular holder 120, and opens/closes a light passage through operations of the opening/closing members 119, 119. The circular holder 120 is formed such that a front-side member 120a and a rear-side member 120b are coupled at the front and the rear thereof, respectively.

In the lens barrier 118, an outer circumferential portion of the circular holder 120 is mounted on a front surface of the circumferential surface portion 116 of the moving frame 113, and the opening/closing members 119 are positioned at the front-side recess 113a of the moving frame 113.

With the lens barrier 118 mounted on the first movable unit 19, an accessory ring 121 is mounted on a side of outer surfaces of the moving frame 113 and the circular holder 120.

With the lens barrel 3 configured as described above, as shown in FIG. 22, the first actuator 101 of the light amount adjusting device 67, the second actuator 102 of the light amount adjusting device 67, and the arm portion 32 of the holding arm 29 of the focus moving unit 28 are positioned between adjacent ones of the guide projections 63, 63, 63 of the linear guide 61, respectively, as viewed in the optical-axis direction.

Accordingly, when the light amount adjusting device 67 and the focus moving unit 28 are moved in the optical-axis direction, the guide projections 63, 63, 63 of the linear guide 61 for guiding the first movable unit 19 and the second movable unit 65 in the optical-axis direction do not interfere with the first actuator 101, the second actuator 102, and the holding arm 29, thereby realizing miniaturization based on the effective utilization of an arrangement space.

It is noted that the thin-walled portion 88b is formed on the base body 88 of the second movable unit 65, and also the pressing plate 111 is approximately U-shaped and fixed to the portion other than the thin-walled portion 88b of the base body 88 (see FIG. 21), and when the holding arm 29 is moved frontward, the arm portion 32 is inserted into the notch 88a for forming the thin-walled portion 88b. Accordingly, the second movable unit 65 and the fixed member 16 for supporting the focus moving unit 28 can be arranged close to each other, thereby realizing a thickness reduction of the lens barrel 3 in the optical-axis direction.

In addition, in the optical-axis direction, one guide projection 63 (the guide projection 63A shown in FIG. 22) of the linear guide 61 is positioned between the driving coils 85, 85 of the blur correction mechanism 87, so that interference between the driving coils 85, 85 and the guide projection 63A can be avoided, thereby realizing a further miniaturization of the lens barrel 3.

Furthermore, the guide projections 63, 63, 63 of the linear guide 61 are provided so as to be spaced apart in the circumferential direction, thereby stabilizing the operations during movements of the first movable unit 19 and the second movable unit 65 in the optical-axis direction.

In the lens barrel 3 configured as described above, a state, in which any of the first movable unit 19, the second movable unit 65, and the focus moving unit 28 is positioned at a rear-side moving end, is a retracted position in which the lens barrel 3 is accommodated in the apparatus body 2 (see FIG. 6). In the retracted position, the lens barrel 3 does not project frontward from the apparatus body 2 (see FIG. 1).

Figure 36:
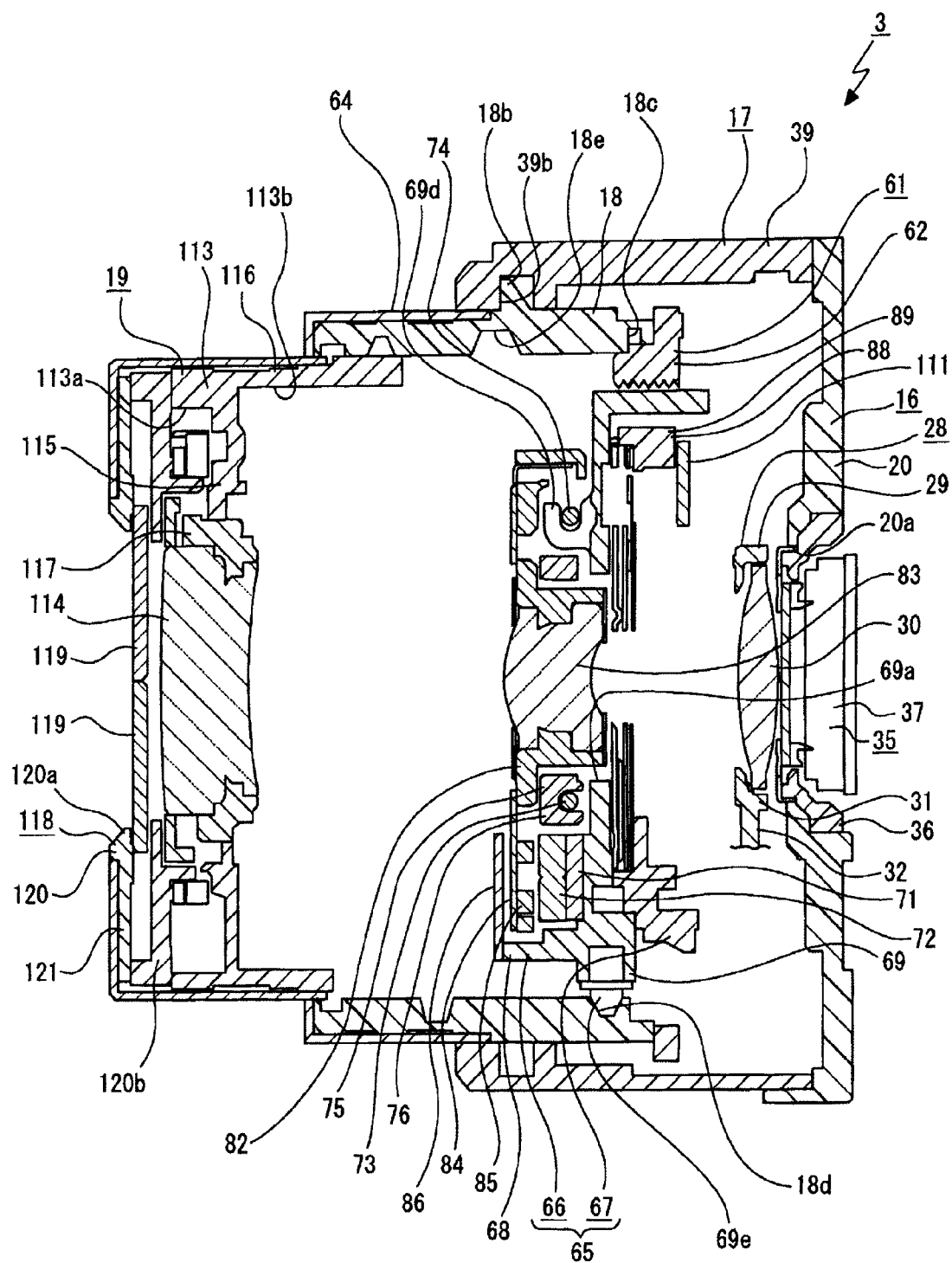
FIG. 36 is an enlarged sectional view of the lens barrel in a wide angle position.

When the lens barrel 3 moves from the retracted position (see FIG. 6) to a wide-angle position (see FIG. 36), the came cylinder 18 is moved frontward while rotating, and the linear guide 61 is moved frontward integrally with the cam cylinder 18. While the first movable unit 19 and the second movable unit 65 are moved frontward by the rotation of the cam cylinder 18, an amount of the frontward movement of the first movable unit 19 is large, whereas an amount of the frontward movement of the second movable unit 65 is small.

Figure 37:
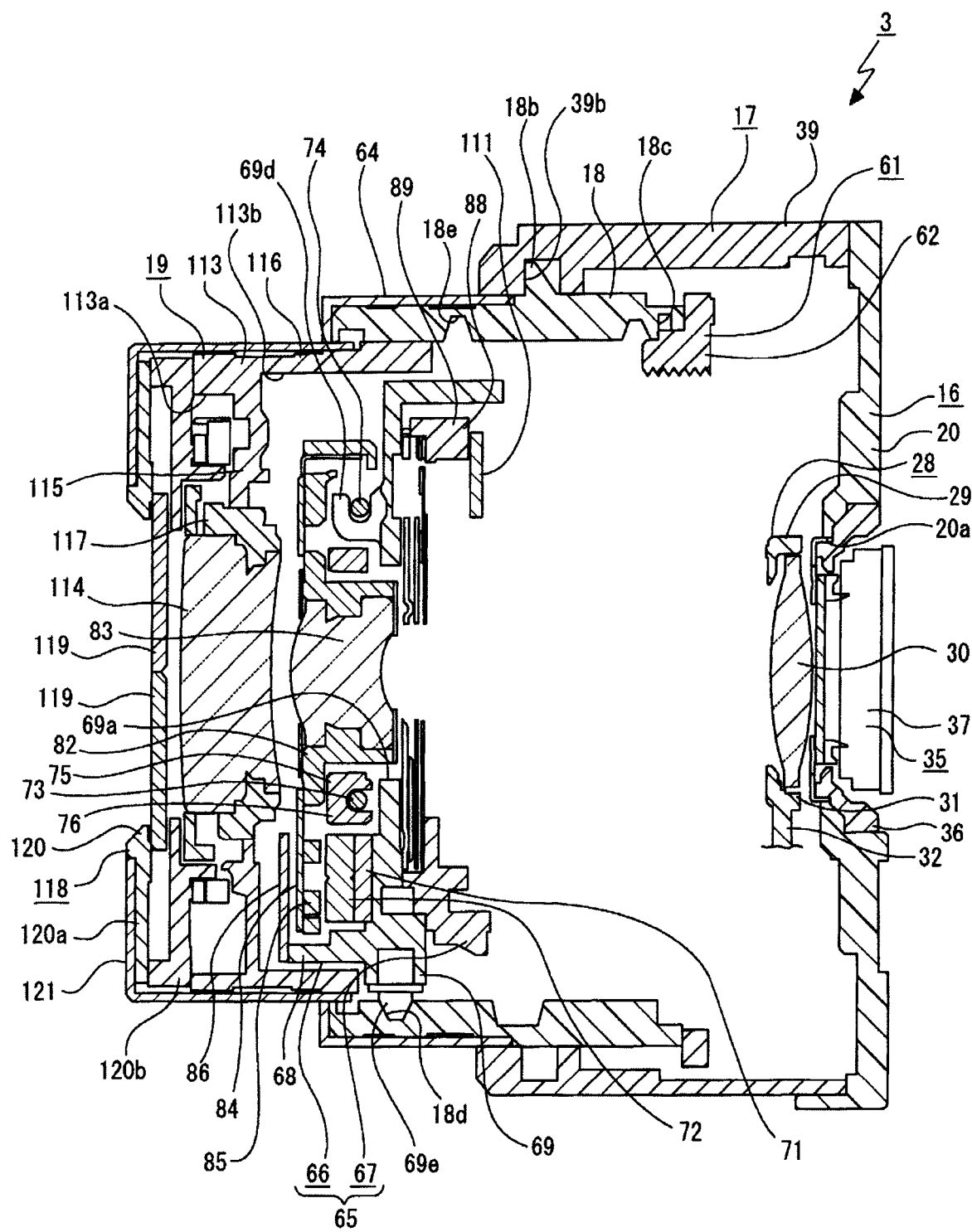
FIG. 37 is an enlarged sectional view of the lens barrel in a telephoto position.

When the lens barrel 3 moves from the wide-angle position to a telephoto position (see FIG. 37), the cam cylinder 18 is rotated without moving in the front-rear direction. The second movable unit 65 is moved frontward by the rotation of the cam cylinder 18 so as to near the first movable unit 19. In the telephoto position, the second movable unit 65 is positioned inside the rear-side recess 113b of the first movable unit 19 with a part thereof excluded (see FIG. 37), by the guided portions 69e, 69e, 69e provided on the base frame 68 being inserted into the insertion notches 116c, 116c, 116c formed in the moving frame 113, respectively (see FIG. 35).

The focus moving unit 28 is operated by a driving source independent of those of the first movable unit 19 and the second movable unit 65, and in each of the states from the retracted position to the telephoto position, the focusing function is executed by the focus lens group 30 being moved in the optical-axis direction.

As described above, the lens group 114 of the first movable unit 19, the lens group 83 of the second movable unit 65, and the focus lens group 30 of the focus moving unit 28 are used as movable lens groups which are moved in the optical-axis direction for zooming and focusing. The lens group 114 functions as a first lens group, the lens group 83 functions as a second lens group, the focus lens group 30 functions as a third lens group. It is noted that any of the lens group 114, the lens group 83, and the focus lens group 30 may be a combination of a plurality of lenses or may be a single lens.

When the lens barrel 3 moves from the telephoto position to the wide-angle position, the cam cylinder 18 is moved in a direction opposite to the above-mentioned direction without moving in the front-rear direction, and the second movable unit 65 is moved rearward so as to be away from the first movable unit 19. When the lens barrel 3 moves from the wide-angle position to the retracted position, the cam cylinder 18 is moved rearward integrally with the linear guide 61, while similarly rotating in the opposite direction, and the first movable unit 19 and the second movable unit 65 are moved rearward.

It is noted that in the base frame 68 of the second movable unit 65, the outer circumferential surface is cut into a plurality of flat portions, and a left-side surface is formed into a first flat surface portion 68A facing leftward and a lower surface off to the right is formed into a second flat surface portion 68B facing diagonally to the lower right, as shown in FIG. 35.

By aligning one driving coil 85 with the first flat surface portion 68A such that a longitudinal direction of that driving coil 85 is the up-down direction, it is configured to ensure an arrangement space advantageous to the driving coil 85.

In addition, the second flat surface portion 68B is formed so as to be aligned with a right end of the moving stroke of the first correcting moving frame 75, and one Hall sensor 84d is arranged on a side (right side) of the second flat surface portion 68B with respect to a nearby driving coil 85. By arranging the Hall sensor 84d which is small in outside shape further toward the second flat surface portion 68B than the driving coil 85 which is larger in outside shape, it is configured to realize the effective utilization of an arrangement space.

Furthermore, in the second movable unit 65, it is configured such that the first correcting moving frame 75 is moved in the left-right direction while guided by the first guide shaft 73, by the driving coil 85 positioned on the left side, and the second correcting moving frame 82 is moved in the up-down direction while guided by the second guide shaft 80, by the driving coil 85 positioned on the lower side. At this instance, by arranging the driving coil 85 positioned on the left side further toward the first guide shaft 73 than the nearby Hall sensor 84d, and by arranging the driving coil 85 positioned on the lower side further toward the second guide shaft 80 than the nearby Hall sensor 84d, the driving coil 85 for movement in the left-right direction and the first guide shaft 73 for guiding in the left-right direction are positioned close to each other, and also the driving coil 85 for movement in the up-down direction and the second guide shaft 80 for guiding in the up-down direction are positioned close to each other, so that the first correcting moving frame 75 and the second correcting moving frame 82 are hard to gouge during movements, thereby realizing their smooth operations.

The present application contains subject matter related to Japanese Patent Application No. 2007-004738 filed in the Japanese Patent Office on Jan. 12, 2007, the entire content of which being incorporated herein by reference.

Specific shapes and structures of the respective parts and components that have been disclosed in the above embodiment are provided merely as one example for illustrative purposes for ease of understanding of various embodiments for carrying out the present invention, and these shapes and structures are not to be construed as limiting the technical scope of the present invention.

What is claimed is:

1. A light amount adjusting device comprising:
a cover plate having a light-passing hole;
a first separator being sheet-shaped and having a hole;
a second separator being elastically deformable and sheet-shaped, positioned on a side opposite to the cover plate with the first separator therebetween, and having a hole;
a first light amount adjusting blade being movable between the cover plate and the first separator, for adjusting an amount of light;

a second light amount adjusting blade being movable between the first separator and the second separator, for adjusting the amount of light;

a base body to which the cover plate, the first separator, and the second separator are mounted, having a throughhole and mounting grooves, the throughhole being formed to have a diameter larger than a diameter of the hole of the second separator, the mounting grooves allowing the second separator to be mounted therein and being opened toward the throughhole;

a first actuator for operating the first light amount adjusting blade; and a second actuator for operating the second light amount adjusting blade, wherein the base body is formed by injection molding using a first mold and a second mold which are separated in a direction in which the throughhole passes through, the mounting groove is formed by forming the mounting groove forming projections in the first mold and the second mold, respectively, the mounting groove forming projections projecting in such directions as to come closer to each other, and coming into contact with each other during abutment of the first and second molds for charging resin melt into cavities, and the second separator is mounted onto the base body by allowing the elastically deformed second separator to be elastically returned so as to insert at least a part of an outer circumferential portion thereof into the mounting grooves, by positioning the second separator further toward the second light amount adjusting blade than the throughhole, and by positioning the hole on an inner side of the throughhole.

2. The light amount adjusting device according to claim 1, wherein a plurality of mounting projections are provided on the outer circumferential portion of the second separator and spaced apart in a circumferential direction, the mounting projections being inserted into the mounting grooves of the base body.

3. The light amount adjusting device according to claim 1, wherein a pair of shutter blades are used as the first light amount adjusting blade, a light reducing filter is used as the second light amount adjusting blade, the cover plate is formed from a metallic material, and a sliding projection along which the first light amount adjusting blade is slid is provided on the cover plate.

4. The light amount adjusting device according to claim 3, wherein first sliding projections and second sliding projections are provided as the sliding projection of the cover plate, the first and second sliding projections having different amounts of projection and being slid by the pair of shutter blades, respectively.

5. The light amount adjusting device according to claim 3, wherein the shutter blades are rotatably supported by the base body, and the sliding projections of the cover plate are formed into approximate arcs on circles having rotating centers of the shutter blades as centers.

6. An image capture apparatus including a lens barrel having predetermined lens groups arranged therein and an apparatus body supporting the lens barrel, and incorporating therein a light amount adjusting device for adjusting an amount of light captured into the lens barrel via the lens groups, the image capture apparatus comprising:

a cover plate having a light-passing hole;

a first separator being sheet-shaped and having a hole;

a second separator being elastically deformable and sheet-shaped, positioned on a side opposite to the cover plate with the first separator therebetween, and having a hole;

a first light amount adjusting blade being movable between the cover plate and the first separator, for adjusting the amount of light;

a second light amount adjusting blade being movable between the first separator and the second separator, for adjusting the amount of light;

a base body to which the cover plate, the first separator, and the second separator are mounted, having a throughhole and mounting grooves, the throughhole being formed to have a diameter larger than a diameter of the hole of the second separator, the mounting grooves allowing the second separator to be mounted therein and being opened toward the throughhole;

a first actuator for operating the first light amount adjusting blade; and a second actuator for operating the second light amount adjusting blade, wherein the base body is formed by injection molding using a first mold and a second mold which are separated in a direction in which the throughhole passes through, the mounting groove is formed by forming the mounting groove forming projections in the first mold and the second mold, respectively, the mounting groove forming projections projecting in such directions as to come closer to each other, and coming into contact with each other during abutment of the first and second molds for charging resin melt into cavities, and the second separator is mounted onto the base body by allowing the elastically deformed second separator to be elastically returned so as to insert at least a part of an outer circumferential portion thereof into the mounting grooves, by positioning the second separator further toward the second light amount adjusting blade than the throughhole, and by positioning the hole on an inner side of the throughhole.

* * * * *